US010065320B2

(12) United States Patent
Uchiyama

(10) Patent No.: US 10,065,320 B2
(45) Date of Patent: Sep. 4, 2018

(54) IMAGE PROCESSING APPARATUS, IMAGE PROCESSING SYSTEM, IMAGE PROCESSING METHOD, AND COMPUTER PROGRAM

(71) Applicant: Keyence Corporation, Osaka (JP)

(72) Inventor: Naoya Uchiyama, Osaka (JP)

(73) Assignee: Keyence Corporation, Osaka (JP)

( * ) Notice: Subject to any disclaimer, the term of this patent is extended or adjusted under 35 U.S.C. 154(b) by 344 days.

(21) Appl. No.: 14/956,414

(22) Filed: Dec. 2, 2015

(65) Prior Publication Data

US 2016/0184997 A1 Jun. 30, 2016

(30) Foreign Application Priority Data

Dec. 25, 2014 (JP) ................................. 2014-262241

(51) Int. Cl.
*B25J 9/16* (2006.01)

(52) U.S. Cl.
CPC ... *B25J 9/1697* (2013.01); *G05B 2219/39369* (2013.01); *G05B 2219/39397* (2013.01); *G05B 2219/39484* (2013.01); *G05B 2219/40425* (2013.01); *G05B 2219/40607* (2013.01); *Y10S 901/09* (2013.01)

(58) Field of Classification Search
CPC .............................. B25J 9/1697; B25J 9/1692
USPC .................................................. 700/248, 259
See application file for complete search history.

(56) References Cited

U.S. PATENT DOCUMENTS

| 6,889,118 | B2 * | 5/2005 | Murray, IV | B25J 9/161 |
| | | | | 318/568.11 |
| 8,355,816 | B2 * | 1/2013 | Saito | B25J 9/1612 |
| | | | | 700/118 |
| 9,195,233 | B2 * | 11/2015 | Perrone | G05D 1/0088 |
| 9,457,470 | B2 * | 10/2016 | Lundberg | B25J 9/1692 |
| 2014/0288710 | A1 * | 9/2014 | Ikenaga | B25J 9/1697 |
| | | | | 700/259 |
| 2015/0045955 | A1 * | 2/2015 | Hashiguchi | B25J 9/161 |
| | | | | 700/264 |
| 2016/0184995 | A1 | 6/2016 | Uchiyama | |

FOREIGN PATENT DOCUMENTS

| JP | 04-134501 | 5/1992 |
| JP | 09-091022 | 4/1997 |

* cited by examiner

*Primary Examiner* — Timothy R Waggoner
(74) *Attorney, Agent, or Firm* — Kilyk & Bowersox, P.L.L.C.

(57) ABSTRACT

There is provided an image processing apparatus, which are capable of controlling a motion of a robot with high accuracy without coding a complex robot motion control program point by point. First coordinate values being each of position coordinates of movement destinations of an end effector of a robot are acquired. Second coordinate values being position coordinates of a target are detected based on an image of the target captured at each of the movement destinations. Selections of a plurality of operations which a robot controller is made to execute are accepted out of a plurality of operations including at least an operation of moving the end effector to the first coordinate values or an operation of moving the end effector to the second coordinate values, to accept a setting of an execution sequence of the plurality of operations the selections of which have been accepted.

20 Claims, 33 Drawing Sheets

```
181 { OPEN "COM1:" AS #1

182 { MOVE POS0

183 { PRINT #1, "T1"

184 { INPUT #1, Val1, Val2, Val3

POS1.X=Val1
185 { POS1.Y=Val2
      POS1.T=Val3

186 { MOVE POS1

//COMMENT: CLOSE HAND
187 { //COMMENT: MOVE TO PLACING POSITION
      //COMMENT: OPEN HAND

188 { CLOSE #1
```

FIG. 31

```
3100  OPEN "COM1:" AS #1

3101  SWITCH Val0

CASE 0:
           PRINT #1, "EX0"
           MOVE POS0
           PRINT #1, "T1"

INPUT #1, Val1, Val2, Val3
3102       POS1.X=Val1
           POS1.Y=Val2
           POS1.T=Val3
           MOVE POS0
           //COMMENT: CLOSE HAND
           //COMMENT: MOVE TO PLACING POSITION
           //COMMENT: OPEN HAND

CASE 1:
           PRINT #1, "EX1"
           MOVE POS1
           PRINT #1, "T1"
           INPUT #1, Val1, Val2, Val3
3103       POS1.X=Val1
           POS1.Y=Val2
           POS1.T=Val3
           MOVE POS1
           //COMMENT: CLOSE HAND
           //COMMENT: MOVE TO PLACING POSITION
           //COMMENT: OPEN HAND

SEND

CLOSE #1
```

IMAGE PROCESSING APPARATUS, IMAGE PROCESSING SYSTEM, IMAGE PROCESSING METHOD, AND COMPUTER PROGRAM

CROSS-REFERENCE TO RELATED APPLICATIONS

The present application claims foreign priority based on Japanese Patent Application No. 2014-262241, filed Dec. 25, 2014, the contents of which is incorporated herein by reference.

BACKGROUND OF THE INVENTION

1. Field of the Invention

The present invention relates to an image processing apparatus, an image processing system, an image processing method and a computer program, which are capable of controlling a motion of a robot with high accuracy without coding a complex robot motion control program point by point.

2. Description of Related Art

There have been developed a large number of control systems in which an image of a working area of a robot is captured by an imaging device, a position of a workpiece in the captured image is detected, and position information of the detected workpiece is calculated based on the captured image, to control a motion of the robot with high accuracy.

For example, Unexamined Japanese Patent Publication No. H4-134501 discloses a robot controller that controls a robot motion based on information detected by a sensor including an imaging device. Further, Unexamined Japanese Patent Publication No. H9-091022 discloses a robot controller that transmits a load module (robot motion control program) compiled in an external computer, to control a robot motion.

As thus described, in the conventional robot control system, in order to perform elaborate motion control, position coordinates calculated in a coordinate system displayed in an image processing apparatus are converted to position coordinates in a coordinate system with which the robot controller makes an end effector take a motion. Processing to calculate a conversion formula for performing the coordinate conversion is called calibration. The end effector herein means an end portion of a robot arm, which can grasp and firmly fix a workpiece, for example.

A motion (movement) command to the end effector of the robot is obtained by the image processing apparatus converting position coordinates based on the captured image to coordinate values of actual position coordinates based on a calibration result. The image processing apparatus transmits the motion (movement) command to the robot controller along with the converted coordinate values.

In order for the robot controller to make the robot take a correct motion, a user needs to create a robot operation program. In the operation program, there is sequentially described a series of operations such as returning the end effector of the robot to an original position, moving the end effector to a specific position, grasping a workpiece, and releasing the workpiece.

However, it is also necessary for the user to create a program for a series of operations including data communication with the image processing apparatus. Thus, controlling the motion of the robot generates the need to create not only the operation program for the robot controller but also the program for the series of operations related to the image processing apparatus. Hence there has been a problem of taking considerable time to start up a whole system.

SUMMARY OF THE INVENTION

The present invention was made in view of such circumstances. It is an object of the present invention to provide an image processing apparatus, an image processing system, an image processing method and a computer program, which are capable of controlling a motion of a robot with high accuracy without coding a complex robot motion control program point by point.

For achieving the above object, an image processing apparatus according to one embodiment is an image processing apparatus including: a communication device capable of performing data communication with a robot controller that controls a motion of a robot; and an imaging device that captures an image of a target being a target for an operation by the robot. The apparatus includes: a movement coordinate acquiring unit for acquiring first coordinate values being each of position coordinates of movement destinations of an end effector of the robot; an imaging controlling unit for controlling an operation of the imaging device so as to capture an image of a target at each of the movement destinations of the end effector; an image detecting unit for detecting second coordinate values being position coordinates of the target based on the image of the target captured at each of the movement destinations; an operation setting accepting unit for accepting selections of a plurality of operations which the robot controller is made to execute out of a plurality of operations including at least an operation of moving the end effector to the first coordinate values or an operation of moving the end effector to the second coordinate values, and accepting a setting of an execution sequence of the plurality of operations the selections of which have been accepted; and a program generating unit for generating an operation program corresponding to each of the plurality of operations, the selections of which have been accepted in the operation setting accepting unit, in accordance with the execution sequence the setting of which has been accepted.

Further, in an image processing apparatus according to another embodiment, it is preferable that in the first aspect, the program generating unit generate, as editable text data, each of the operation programs corresponding to the plurality of operations the selections of which have been accepted, in accordance with the execution sequence the setting of which has been accepted.

Further, in an image processing apparatus according to still another embodiment, it is preferable that in the first or second aspect, the operation setting accepting unit accept settings of operation conditions including at least a kind of operation and an operation sequence with respect to each imaging trigger or processing switching command which is received from the robot controller, the imaging trigger indicating timing for starting to capture the image of the target by the imaging device.

Further, in an image processing apparatus according to still another embodiment, it is preferable that in the third aspect, the program generating unit generate an operation program concerning a series of plurality of operations including at least an operation of moving the end effector to the first coordinate values or the second coordinate values and an operation of transmitting the imaging trigger out of the operations by the robot controller.

Further, in an image processing apparatus according to still another embodiment, it is preferable that in any one of the first to fourth aspects, the operation setting accepting unit accept a setting of a standby command to the end effector.

Further, an image processing apparatus according to still another embodiment preferably includes, in any one of the first to fifth aspects, a robot selection accepting unit for accepting a selection of a type of the robot. In the apparatus, it is preferable that the program generating unit generate the operation program in accordance with a format specified by type of the robot the selection of which has been accepted.

Further, in an image processing system according to still another embodiment, it is preferable that in any one of the first to sixth aspects, the program generating unit generate the operation program to establish data communication with the robot controller.

Further, an image processing apparatus according to still another embodiment preferably includes, in any one of the first to seventh aspects, a movement command transmitting unit for transmitting to the robot controller a movement command to move the end effector to the first coordinate values or the second coordinate values.

Further, an image processing apparatus according to still another embodiment preferably includes, in any one of the first to seventh aspects, a movement command transmitting unit for transmitting to the robot controller a movement command to move the end effector to a position a specification of which has been accepted on the captured image where the target is displayed.

Further, an image processing apparatus according to still another embodiment preferably includes, in any one of the first to ninth aspects, a movement destination selecting unit for acquiring a plurality of sets of first coordinate values of the end effector, and accepting a selection of one set of first coordinate values as a movement destination of the end effector out of the plurality of sets of first coordinate values.

Next, for achieving the above object, an image processing system according to still another embodiment is an image processing system composed of a robot controller that controls a motion of a robot; and an image processing apparatus including a communication device connected to the robot controller so as to perform data communication therewith, and an imaging device that captures an image of a target being a target for an operation by the robot. The image processing apparatus includes a movement coordinate acquiring unit for acquiring first coordinate values being each of position coordinates of movement destinations of an end effector of the robot; an imaging controlling unit for controlling an operation of the imaging device so as to capture an image of a target at each of the movement destinations of the end effector; an image detecting unit for detecting second coordinate values being position coordinates of the target based on the image of the target captured at each of the movement destinations; an operation setting accepting unit for accepting selections of a plurality of operations which the robot controller is made to execute out of a plurality of operations including at least an operation of moving the end effector to the first coordinate values or an operation of moving the end effector to the second coordinate values, and accepting a setting of an execution sequence of the plurality of operations the selections of which have been accepted; and a program generating unit for generating an operation program corresponding to each of the plurality of operations, the selections of which have been accepted in the operation setting accepting unit, in accordance with the execution sequence the setting of which has been accepted.

Further, in an image processing system according to still another embodiment, it is preferable that in the eleventh aspect, the program generating unit generate, as editable text data, each of the operation programs corresponding to the plurality of operations the selections of which have been accepted, in accordance with the execution sequence the setting of which has been accepted.

Further, in an image processing system according to still another embodiment, it is preferable that in the eleventh or twelfth aspect, the operation setting accepting unit accept settings of operation conditions including at least a kind of operation and an operation sequence with respect to each imaging trigger or processing switching command which is received from the robot controller, the imaging trigger indicating timing for starting to capture the image of the target by the imaging device.

Further, in an image processing system according to still another embodiment, it is preferable that in the thirteenth aspect, the program generating unit generate an operation program concerning a series of plurality of operations including at least an operation of moving the end effector to the first coordinate values or the second coordinate values and an operation of transmitting the imaging trigger out of the operations by the robot controller.

Further, in an image processing system according to still another embodiment, it is preferable that in any one of the eleventh to fourteenth aspects, the operation setting accepting unit accept a setting of a standby command to the end effector.

Further, in an image processing system according to still another embodiment, it is preferable that in any one of the eleventh to fifteenth aspects, the image processing apparatus include a robot selection accepting unit for accepting a selection of a type of the robot, and the program generating unit generate the operation program in accordance with a format specified by type of the robot the selection of which has been accepted.

Further, in an image processing system according to still another embodiment, it is preferable that in any one of the eleventh to sixteenth aspects, the program generating unit generate the operation program to establish data communication with the robot controller.

Further, in an image processing system according to still another embodiment, it is preferable that in any one of the eleventh to seventeenth aspects, the image processing apparatus include a movement command transmitting unit for transmitting to the robot controller a movement command to move the end effector to the first coordinate values or the second coordinate values.

Further, in an image processing system according to still another embodiment, it is preferable that in any one of the eleventh to seventeenth aspects, the image processing apparatus include a movement command transmitting unit for transmitting to the robot controller a movement command to move the end effector to a position a specification of which has been accepted on the captured image where the target is displayed.

Further, in an image processing system according to still another embodiment, it is preferable that in any one of the eleventh to nineteenth aspects, the image processing apparatus include a movement destination selecting unit for acquiring a plurality of sets of first coordinate values of the end effector, and accepting a selection of one set of first coordinate values as a movement destination of the end effector out of the plurality of sets of first coordinate values.

Next, for achieving the above object, an image processing method according to still another embodiment is an image processing method which can be executed by an image processing system composed of a robot controller that controls a motion of a robot, and an image processing apparatus including a communication device connected to the robot controller so as to perform data communication therewith and an imaging device that captures an image of a target being a target for an operation by the robot. The image processing method includes the steps of; acquiring first coordinate values being each of position coordinates of movement destinations of an end effector of the robot; controlling an operation of the imaging device so as to capture an image of a target at each of the movement destinations of the end effector; detecting second coordinate values being position coordinates of the target based on the image of the target captured at each of the movement destinations; accepting selections of a plurality of operations which the robot controller is made to execute out of a plurality of operations including at least an operation of moving the end effector to the first coordinate values or an operation of moving the end effector to the second coordinate values, and accepting a setting of an execution sequence of the plurality of operations the selections of which have been accepted; and generating an operation program corresponding to each of the plurality of operations, the selections of which have been accepted, in accordance with the execution sequence the setting of which has been accepted.

Next, for achieving the above object, a computer program according to still another embodiment is a computer program which can be executed by an image processing apparatus including: a communication device capable of performing data communication with a robot controller that controls a motion of a robot; and an imaging device that captures an image of a target being a target for an operation by the robot. The computer program allows the image processing apparatus to function as: a movement coordinate acquiring unit for acquiring first coordinate values being each of position coordinates of movement destinations of an end effector of the robot; an imaging controlling unit for controlling an operation of the imaging device so as to capture an image of a target at each of the movement destinations of the end effector; an image detecting unit for detecting second coordinate values being position coordinates of the target based on the image of the target captured at each of the movement destinations; an operation setting accepting unit for accepting selections of a plurality of operations which the robot controller is made to execute out of a plurality of operations including at least an operation of moving the end effector to the first coordinate values or an operation of moving the end effector to the second coordinate values, and accepting a setting of an execution sequence of the plurality of operations the selections of which have been accepted; and a program generating unit for generating an operation program corresponding to each of the plurality of operations, the selections of which have been accepted in the operation setting accepting unit, in accordance with the execution sequence the setting of which has been accepted.

In the first, eleventh, twenty-first and twenty-second aspects, the image processing apparatus acquires first coordinate values being each of position coordinates of movement destinations of the end effector of the robot. Then, an image of the target at each of the movement destinations of the end effector is captured, and second coordinate values being position coordinates of the target is detected based on the image of the target captured at each of the movement destinations. Selections of a plurality of operations which the robot controller is made to execute are accepted out of a plurality of operations including at least an operation of moving the end effector to the first coordinate values or an operation of moving the end effector to the second coordinate values, to accept a setting of an execution sequence of the plurality of operations the selections of which have been accepted. An operation program corresponding to each of the plurality of operations, the selections of which have been accepted, is generated in accordance with the execution sequence the setting of which has been accepted. Accordingly, the operation program for the robot controller to control the motion of the robot from the image processing apparatus can be generated in the image processing apparatus. Hence it is possible to create an operation program that allows even a worker (user), who does not understand machine language which varies by type of the robot, to control the motion of the robot with high accuracy. This eliminates the need for a complex procedure for checking motions every time all operation programs are completed, thus allowing the program to start up as a system in an early stage.

In the second and twelfth aspects, each of the operation programs corresponding to the plurality of operations, the selections of which have been accepted, is generated as editable text data in accordance with the execution sequence the setting of which has been accepted. Accordingly, editing the text data can lead to edition of a desired operation program, thus allowing operation control that meets the user's desire.

In the third and thirteenth aspects, settings of operation conditions including at least a kind of operation and an operation sequence are accepted with respect to each imaging trigger or processing switching command which is received from the robot controller, the imaging trigger indicating timing for starting to capture the image of the target by the imaging device. Hence it is possible to change the operation condition in accordance with the imaging trigger or the processing switching command, and detect position coordinates of the target on the image, which is obtained by capturing the image of the target at appropriate timing in accordance with the operation conditions and on which the target is displayed.

In the fourth and fourteenth aspects, there is generated an operation program concerning a series of plurality of operations including at least an operation of moving the end effector to the first coordinate values or the second coordinate values and an operation of transmitting the imaging trigger out of the operations by the robot controller. Hence the programs concerning the main operations can be automatically generated, and programs concerning specific operations such as grasping the target, releasing the target and establishing data communication with other devices can be additionally written by editing text data by the user.

In the fifth and fifteenth aspects, a setting of a standby command to the end effector is accepted, and thus, setting the standby time until imaging can reduce vibration immediately after the operation and stabilize a position of the robot at the time of imaging. This can enhance the accuracy in detection in the state of the imaging device being fixed to the robot, or the accuracy in position detection in the state of the target being grasped by the robot.

In the sixth and sixteenth aspects, the operation program is generated in accordance with a format specified by type of the robot the selection of which has been accepted. Accordingly, even when the type of the robot is changed, an operation program in accordance with the type of the robot can be generated.

In the seventh and seventeenth aspects, the operation program to establish data communication with the robot controller is generated. This eliminates the need for the user to directly code a program for a communication part, coding of which is complex, thus allowing start-up of the whole system in an early stage.

In the eighth and eighteenth aspects, a movement command to move the end effector to the first coordinate values or the second coordinate values is transmitted to the robot controller. Hence it is possible to control the motion of the robot from the image processing apparatus, and also to perform a test operation of the robot by a certain operation.

In the ninth and nineteenth aspects, a movement command to move the end effector to a position a specification of which has been accepted on the captured image where the target is displayed is transmitted to the robot controller, and thus, just specifying the movement destination of the target on the image allows control of the motion of the robot.

In the tenth and twentieth aspects, a plurality of sets of first coordinate values of the end effector are accepted and a selection of one set of first coordinate values is accepted as a movement destination of the end effector out of the plurality of sets of first coordinate values. This enables selection of the movement destination of the end effector out of the acquired plurality of sets of first coordinate values, and eliminates the need for processing of newly specifying a movement destination.

According to the present invention, the operation program for the robot controller to control the motion of the robot from the image processing apparatus can be generated in the image processing apparatus. Hence it is possible to create an operation program that allows even a worker (user), who does not understand machine language which varies by type of the robot, to control the motion of the robot with high accuracy. This eliminates the need for a complex procedure for checking motions every time all operation programs are completed, thus allowing the program to start up as a system in an early stage.

BRIEF DESCRIPTION OF THE DRAWINGS

FIG. 31 is an illustrative view of an operation program capable of switching to a different operation condition in the image processing system according to the second embodiment of the present invention;

DETAILED DESCRIPTION OF PREFERRED EMBODIMENTS

In the following, an image processing system according to embodiments of the present invention will be described with reference to the drawings.

First Embodiment

Figure 1:
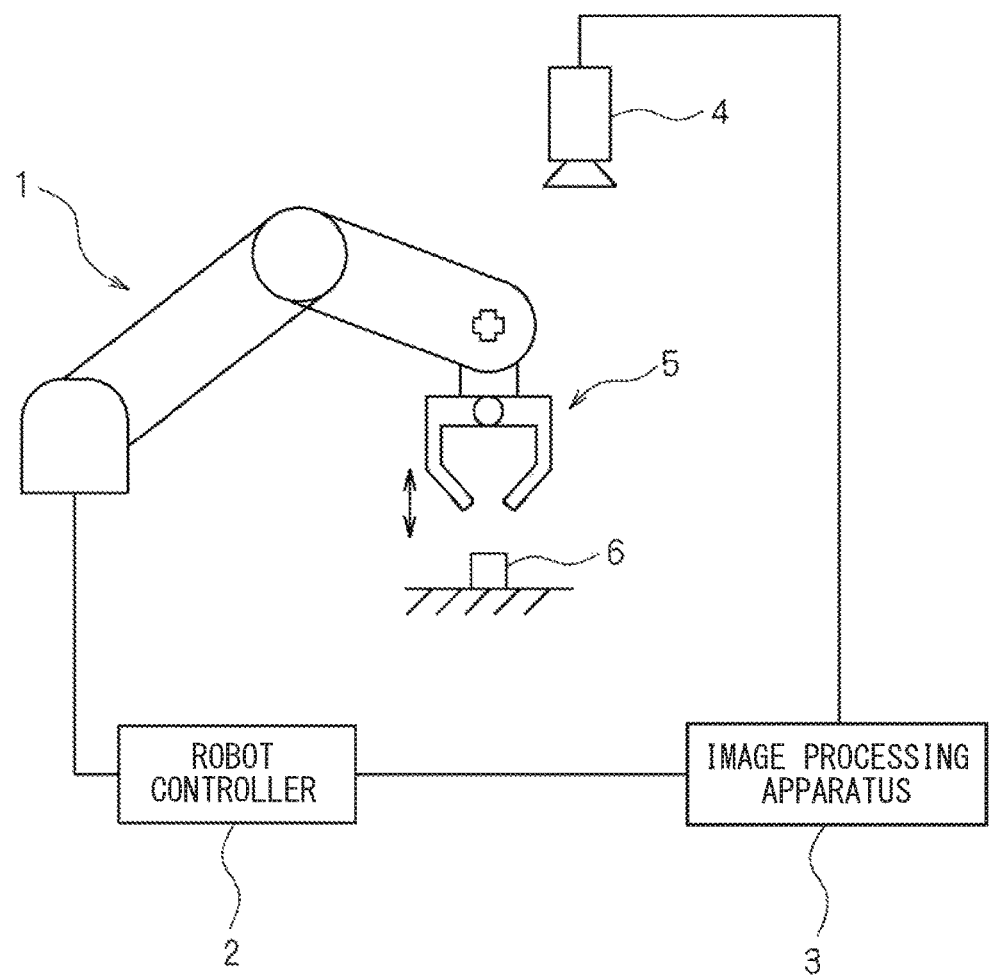
FIG. 1 is a schematic view showing a configuration of an image processing system according to a first embodiment of the present invention.

FIG. 1 is a schematic view showing a configuration of an image processing system according to a first embodiment of the present invention.

As shown in FIG. 1, an image processing system according to the present first embodiment includes a manipulator (robot) 1 for moving a target (workpiece) 6, a robot controller 2 for controlling a motion of the manipulator 1, an image processing apparatus 3, and an imaging device 4. An end effector 5 capable of grasping or releasing the target 6 is provided at the end of the manipulator 1. The robot controller 2 also controls opening and closing motions of the end effector 5.

The imaging device 4 is, for example, a color CCD camera, and captures an image of the workpiece 6 being a moving target. Executing later-mentioned calibration based on the captured image allows linkage between actual position coordinates of the workpiece 6 (coordinates of a movement position of the end effector 5) and position coordinates on an image displayed on a screen.

The manipulator 1 is made up of three arms, and moves the end effector 5 to a desired position by means of an angle formed between the two arms and rotation of a fulcrum of the arm.

Figure 2:
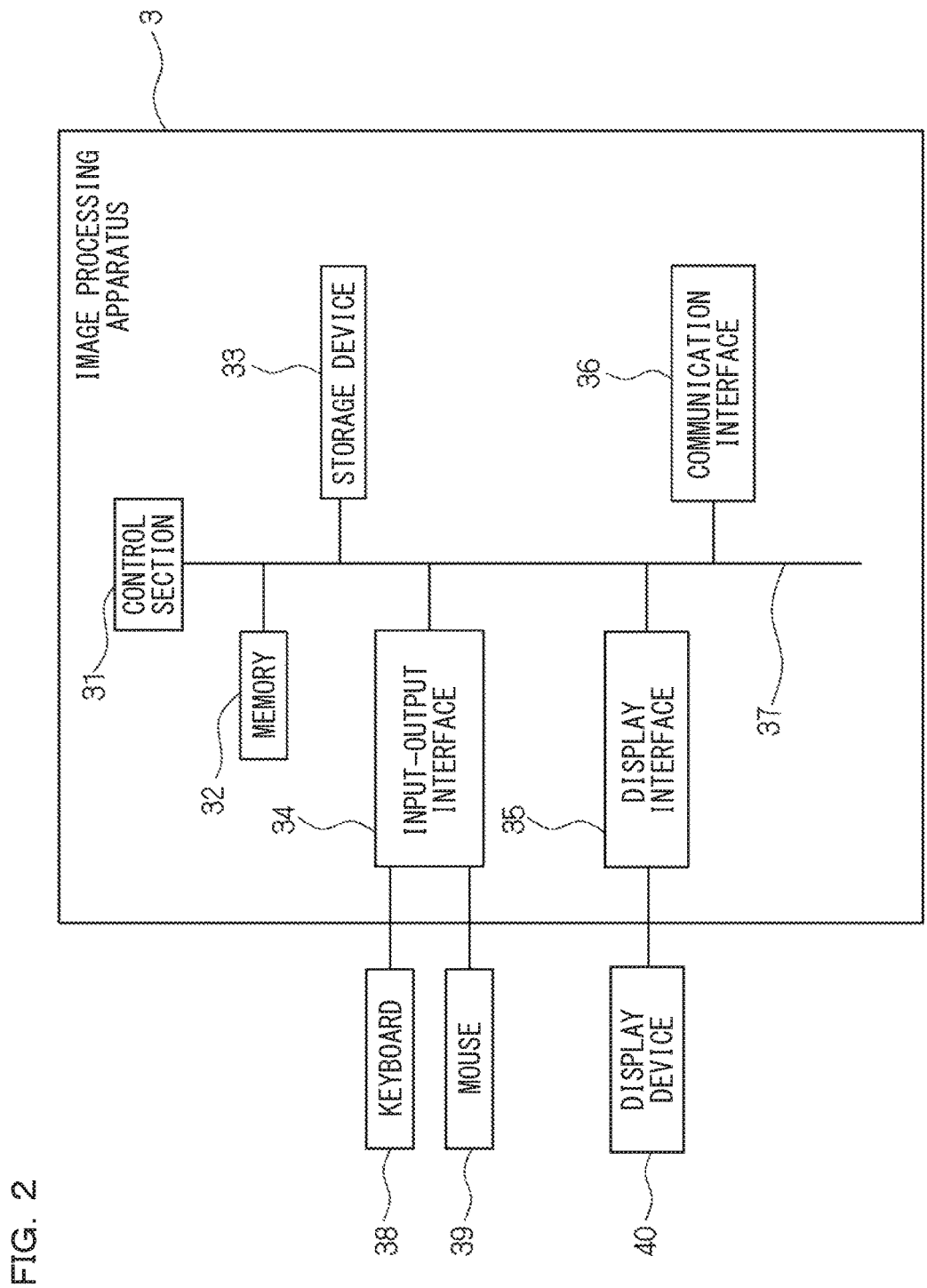
FIG. 2 is a block diagram showing a configuration example of an image processing apparatus in the image processing system according to the first embodiment of the present invention.

FIG. 2 is a block diagram showing a configuration example of the image processing apparatus 3 in the image processing system according to the first embodiment of the present invention. The image processing apparatus 3 according to the first embodiment of the present invention at least includes a control section 31 made up of a CPU (central processing unit) and the like, a memory 32, a storage unit 33, an input-output interface 34, a display interface 35, a communication interface 36, and an internal bus 37 for connecting the foregoing hardware.

The control section 31 is connected with each of the hardware of the image processing apparatus 3 as described above through the internal bus 37. While controlling an operation of each of the foregoing hardware, the control section 31 executes a variety of software functions in accordance with a computer program stored in the storage unit 33. The memory 32 is made up of a volatile memory such as an SRAM or an SDRAM. At the time of executing the computer program, a load module is developed to the memory 32, to store temporal data or the like generated at the time of executing the computer program.

The storage unit 33 is made up of a fixed-type storage device (hard disk) built therein, a volatile memory such as an SRAM, a nonvolatile memory such as a ROM, and the like. The computer program stored in the storage unit 33 is downloaded from a portable record medium such as a DVD or a CD-ROM in which information of a program and data is recorded, or is downloaded through the communication interface 36. At the execution time, the computer program is developed from the storage unit 33 to the memory 32 to be executed.

The communication interface (communication device) 36 is connected to the internal bus 37. By being connected by an external network such as the Internet, a LAN or a WAN, the communication interface 36 can transmit and receive data to and from an external computer or the like.

The input-output interface 34 is connected to data input mediums such as a keyboard 38 and a mouse 39, and accepts input of the data. Further, the display interface 35 is connected to a display device 40 such as a CRT monitor or an LCD, and displays a predetermined image.

The motion of the manipulator 1 has hitherto been controlled by a sequential motion control program stored in the robot controller 2. In that case, it is necessary to execute calibration between actual position coordinates of the end effector 5 of the manipulator 1 and position coordinates on an image displayed on the image processing apparatus 3.

In the calibration, a conversion formula between the actual position coordinates of the end effector 5 of the manipulator 1 and the position coordinates on the image displayed on the image processing apparatus 3 is calculated for each of a plurality of position coordinates. A method for the coordinate conversion is not particularly restricted, and for example, affine transformation is used for the conversion.

[Mathematical Formula 1]

$$\begin{pmatrix} x' \\ y' \\ 1 \end{pmatrix} = \begin{pmatrix} a & b & c \\ d & e & f \\ 0 & 0 & 1 \end{pmatrix} \times \begin{pmatrix} x \\ y \\ 1 \end{pmatrix}$$
$$x' = ax + by + c$$
$$y' = dx + ey + f$$

(Formula 1)

As shown in (Formula 1), based on actual position coordinates (x', y') of the end effector 5 of the manipulator 1 and position coordinates (x, y) on the image displayed on the image processing apparatus 3, coefficients a, b, c, d, e, f of the conversion formula, having six degrees of freedom, are obtained. When the number of corresponding position coordinates exceeds six, a least-squares method is used.

Figure 3:
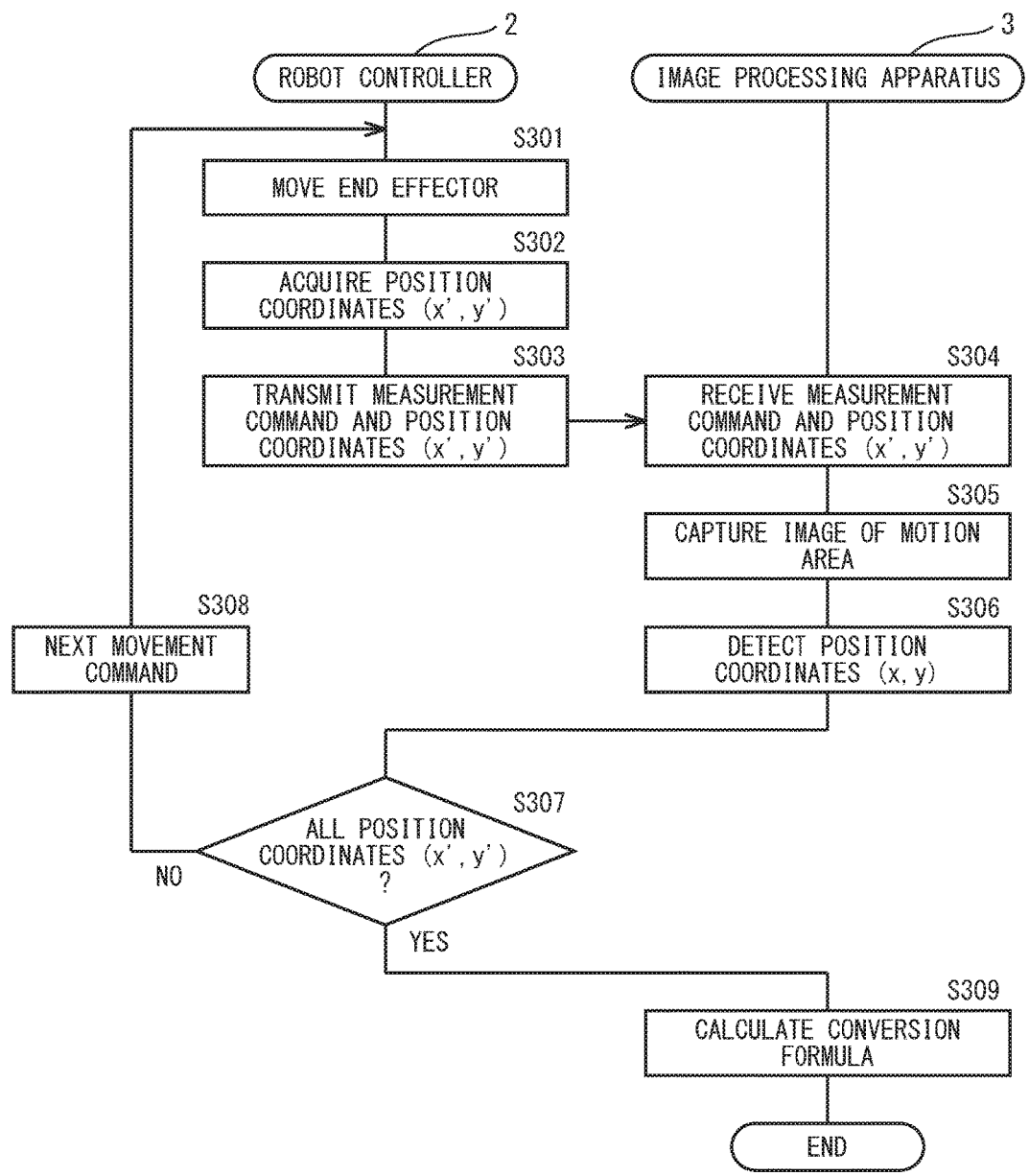
FIG. 3 is a flowchart showing a processing procedure for conventional calibration.

FIG. 3 is a flowchart showing a processing procedure for conventional calibration. As shown in FIG. 3, while the workpiece 6 provided with a mark to become an imaging target is grasped as a calibration target by the manipulator 1, the robot controller 2 moves the end effector 5 to a calibration position (Step S301).

The robot controller 2 acquires position coordinates (x', y') of the moved end effector 5 (Step S302), and transmits a measurement command and the acquired position coordinates (x', y') to the image processing apparatus 3 (Step S303). The image processing apparatus 3 receives the measurement command and the acquired position coordinates (x', y') from the robot controller 2 (Step S304), and captures an image of a motion area of the end effector 5 (Step S305).

The image processing apparatus 3 displays the image of the motion area of the end effector 5, and detects position coordinates (x, y) on the displayed image (Step S306). The robot controller 2 determines whether or not the position coordinates (x, y) on the image have been detected for all of the position coordinates (x', y') for calibration (Step S307). When the robot controller 2 determines that the position coordinates (x, y) on the image have not been detected for all of the position coordinates (x', y') (Step S307: NO), the robot controller 2 issues the next movement command (Step S308), and returns the processing to Step S301, to repeat the foregoing processing.

When the robot controller 2 determines that the position coordinates (x, y) on the image have been detected for all of the position coordinates (x', y') (Step S307: YES), the image processing apparatus 3 calculates a conversion formula in accordance with (Formula 1) (Step S309). Specifically, the six coefficients a, b, c, d, e, f are obtained.

However, the conventional calibration requires a sequential control program which is unique for each type of the manipulator 1. Hence the calibration should be executed using an individual control program for each type. Accordingly, the image processing apparatus 3 executes main calibration.

Figure 4:
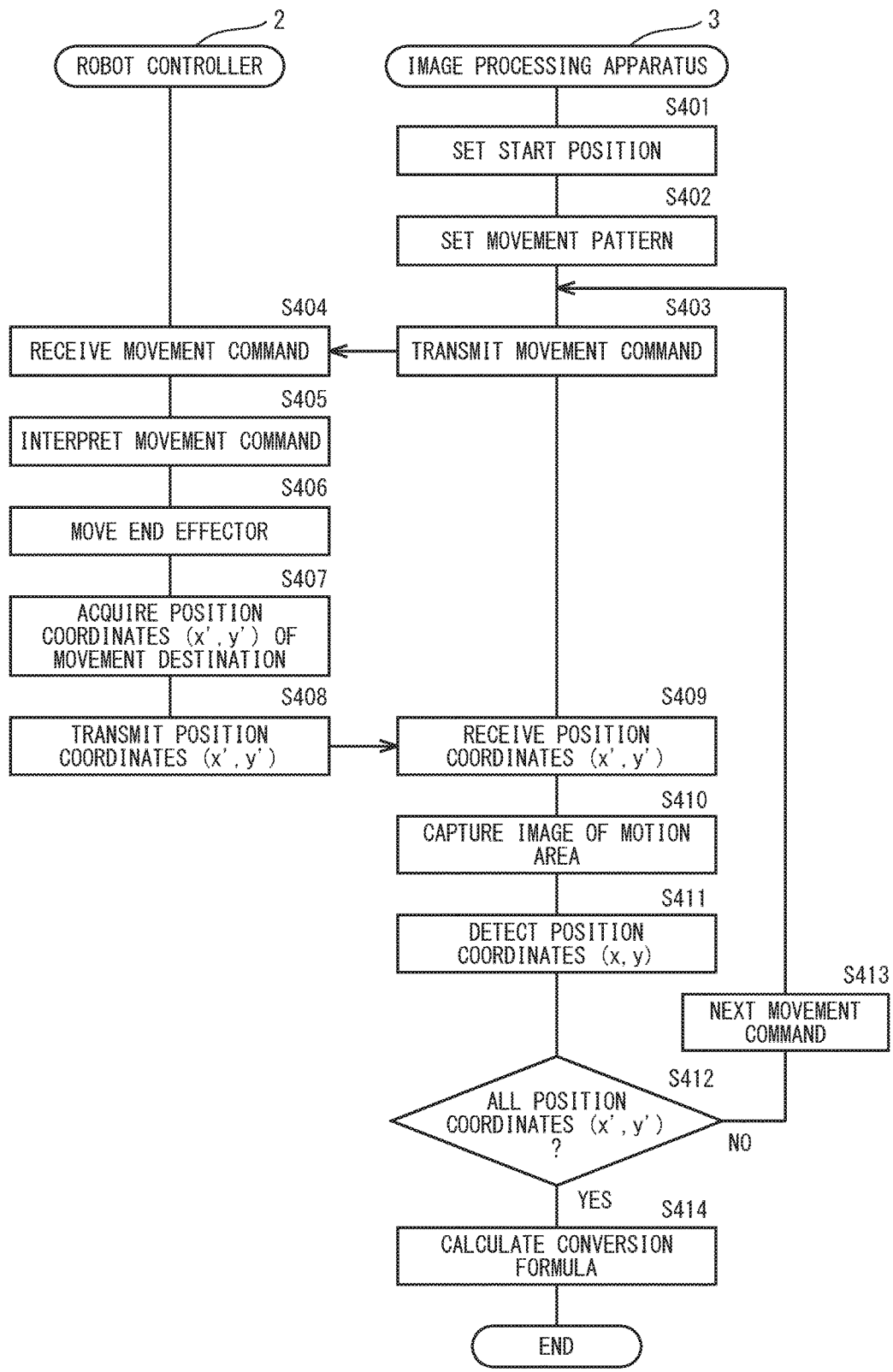
FIG. 4 is a flowchart showing a processing procedure for calibration of the image processing system according to the first embodiment of the present invention.
Figure 5:
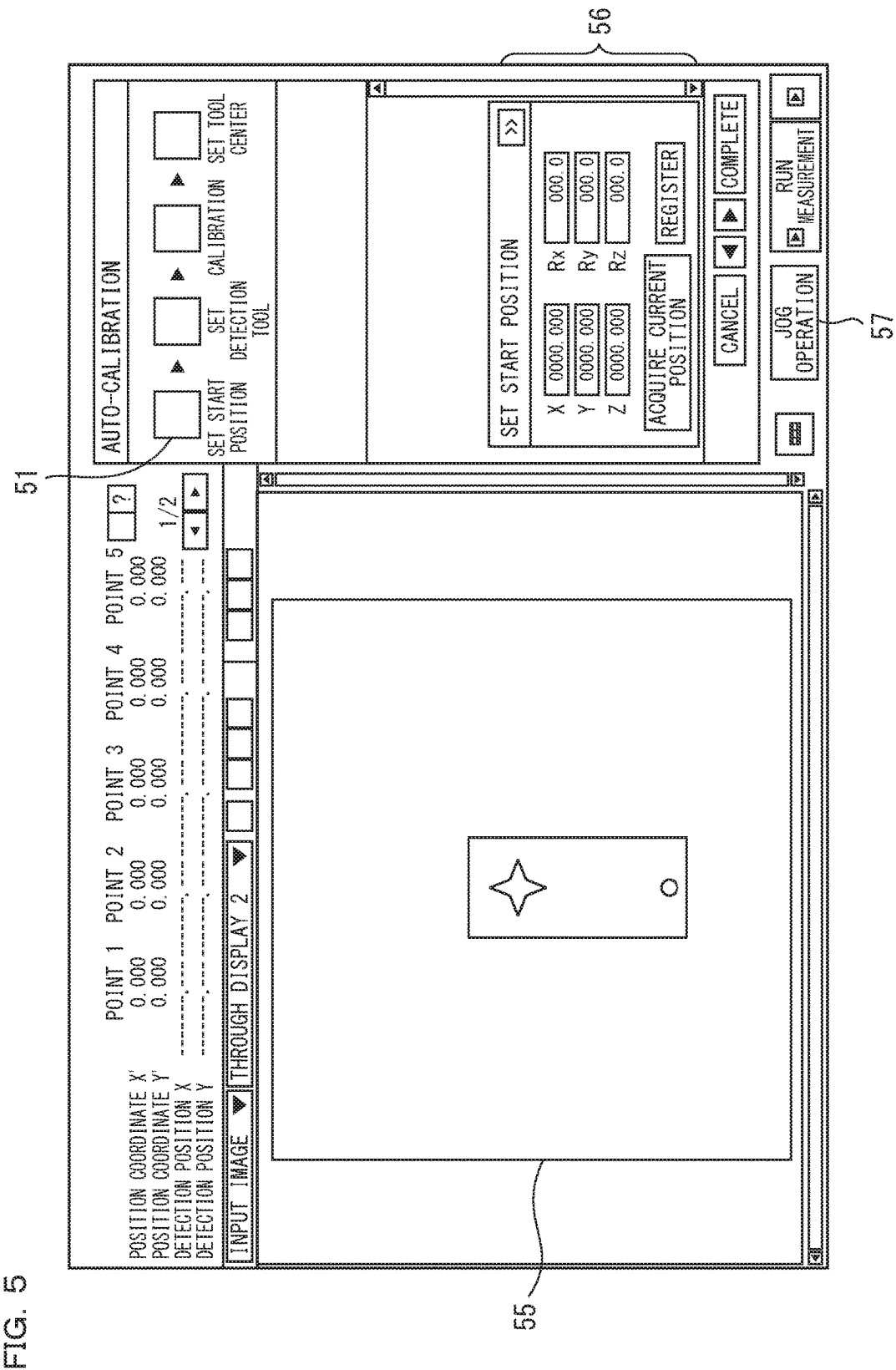
FIG. 5 is an illustrative view of a start position setting screen of the image processing apparatus according to the first embodiment of the present invention.

FIG. 4 is a flowchart showing a processing procedure for calibration of the image processing system according to the first embodiment of the present invention. As shown in FIG. 4, while the workpiece 6 which is provided with a mark to become an imaging target is grasped as a calibration target by the manipulator 1, the image processing apparatus 3 sets a start position of the calibration (Step S401). FIG. 5 is an illustrative view of a start position setting screen of the image processing apparatus 3 according to the first embodiment of the present invention.

As shown in FIG. 5, the captured image of the target 6 is displayed in an image display area 55. When a start position setting button 51 is selected out of calibration execution buttons, a start position setting screen 56 is popped up, and a start position is set. In this case, selecting a jog operation button 57 allows the end effector 5 of the manipulator 1 to move to a predetermined position. Hence the start position of the calibration can be set while the movement destination is checked.

Figure 6:
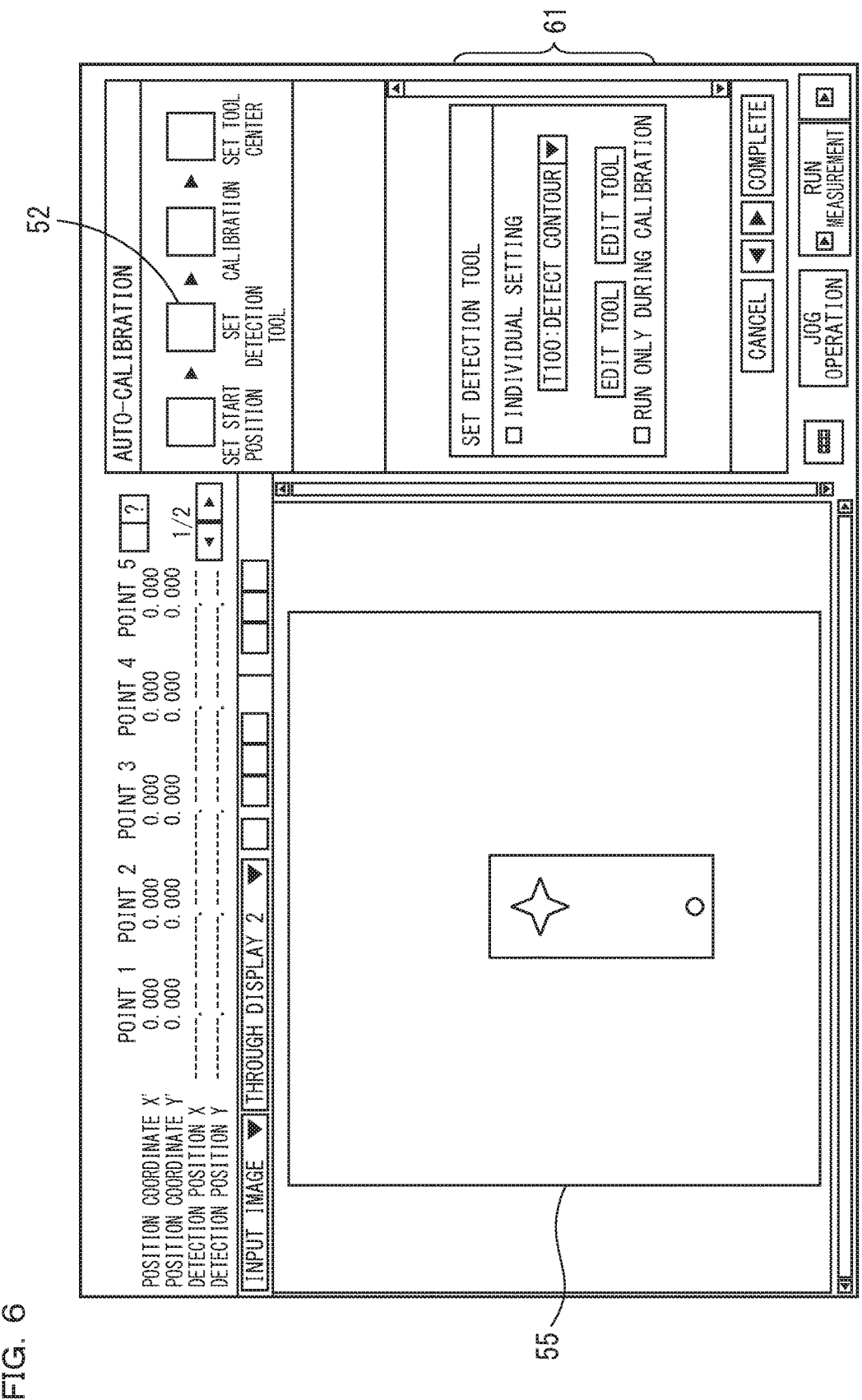
FIG. 6 is an illustrative view of a detection tool setting screen of the image processing apparatus according to the first embodiment of the present invention.

It is to be noted that a detection tool can be set before a movement pattern is set. FIG. 6 is an illustrative view of a detection tool setting screen of the image processing apparatus 3 according to the first embodiment of the present invention.

As shown in FIG. 6, when a detection tool setting button 52 is selected out of the calibration execution buttons, a detection tool selecting area 61 is displayed. The user selects a detection tool in the detection tool selecting area 61, while viewing the image displayed in the image display area 55. In the example of FIG. 6, a contour detection tool has been selected. Other than this, for example, a shading detection tool may be selected.

Figure 7:
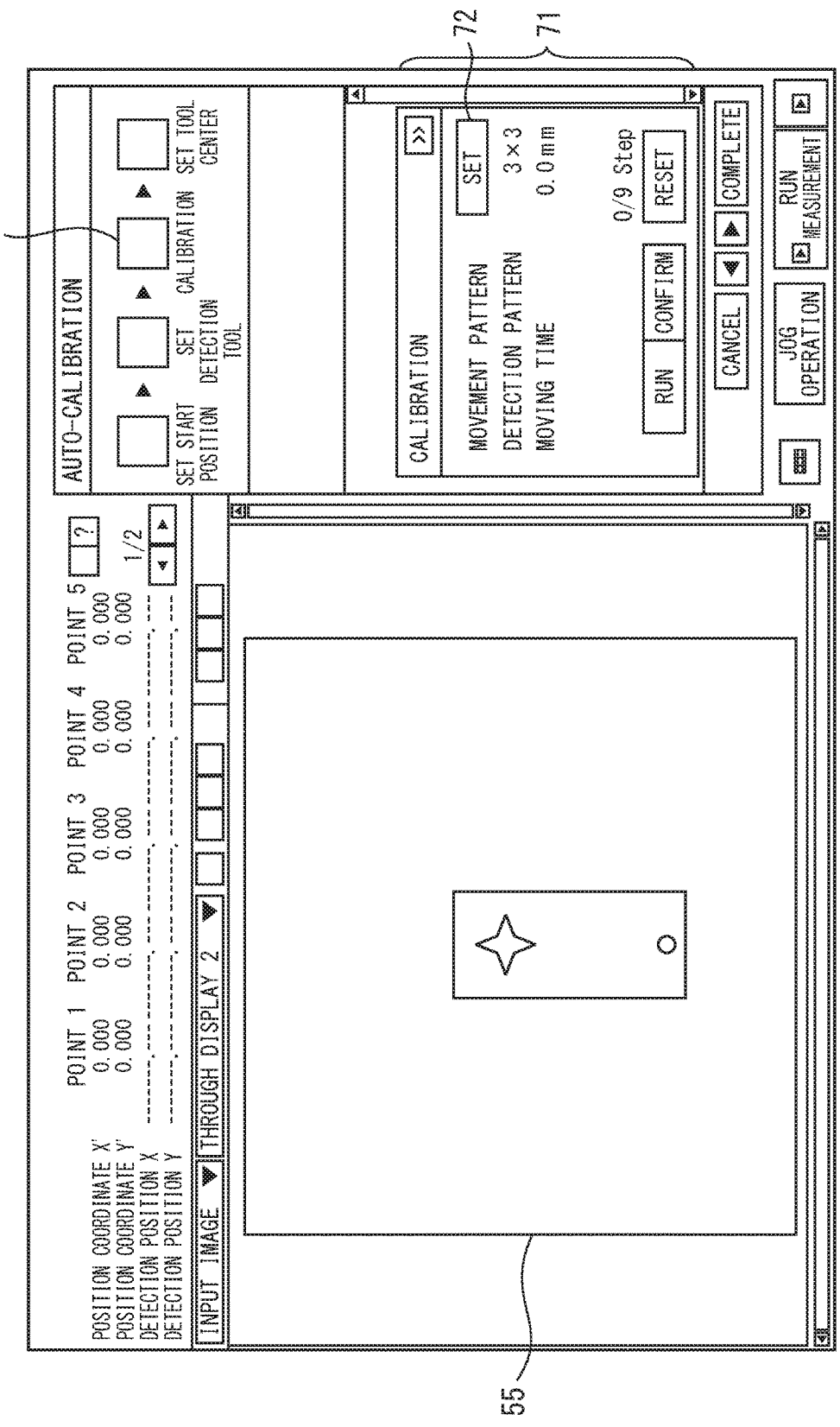
FIG. 7 is an illustrative view of a movement pattern setting screen of the image processing apparatus according to the first embodiment of the present invention.
Figure 8:
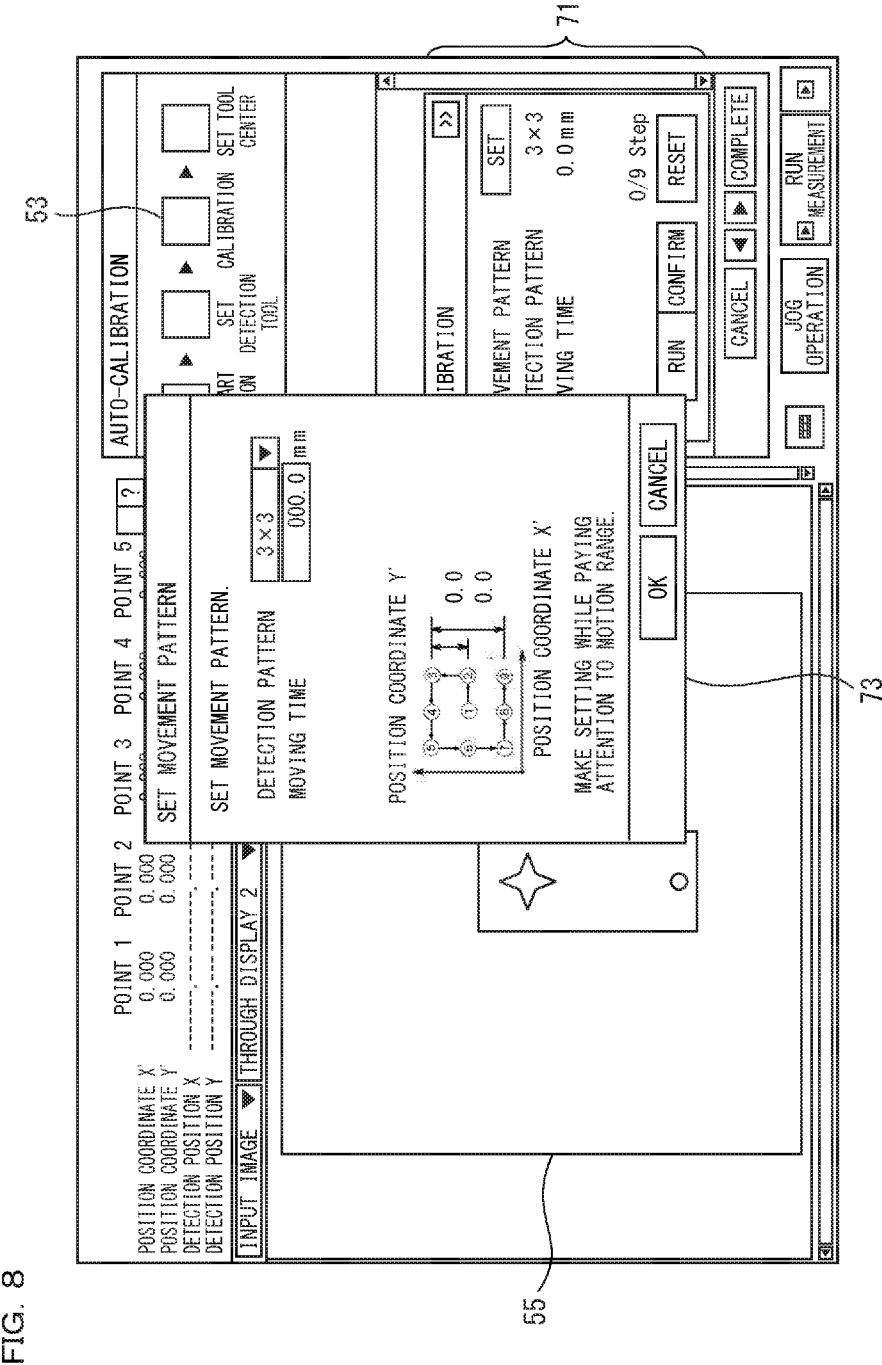
FIG. 8 is an illustrative view of a movement pattern setting screen of the image processing apparatus according to the first embodiment of the present invention.

Returning to FIG. 4, the image processing apparatus 3 sets a movement pattern of the end effector 5 of the manipulator 1 (Step S402). FIGS. 7 and 8 are illustrative views of a movement pattern setting screen of the image processing apparatus 3 according to the first embodiment of the present invention.

As shown in FIG. 7, when a calibration button 53 is selected out of the calibration execution buttons, a movement pattern setting screen 71 is popped up. When a movement pattern setting button 72 is herein selected, a detail setting screen 73 is popped up as shown in FIG. 8.

On the detail setting screen 73, a detection pattern at the time of executing the calibration is set. For example, nine (3×3) settings, 25 (5×5) settings or other settings are accepted. A predetermined movement distance is set, thereby to set a movement pattern as displayed in a lower portion of the detail setting screen 73.

Returning to FIG. 4, the image processing apparatus 3 transmits a movement command to the robot controller 2 (Step S403). The robot controller 2 receives the movement command (Step S404), and interprets the movement command in accordance with the type of the manipulator 1 (Step S405). That is, the command is translated to a load module in machine language that can activate the manipulator 1.

The robot controller 2 moves the end effector 5 to a position specified by the movement command (Step S406). The robot controller 2 acquires position coordinates (x', y') of the movement destination of the moved end effector 5 (Step S407), and transmits the acquired position coordinates (x', y') to the image processing apparatus 3 (Step S408).

The image processing apparatus 3 receives the acquired position coordinates (x', y') from the robot controller 2 (Step S409), and captures an image of a motion area of the end effector 5 (Step S410). The image processing apparatus 3 displays the image of the motion area, and detects position coordinates (x, y) on the displayed image (Step S411).

It should be noted that the position coordinates (x, y) of which position on the displayed image are to be detected are set from the image by use of the set detection tool. For example, when the contour detection tool has been selected as the detection tool, a contour area to be detected needs to be specified.

Figure 9:
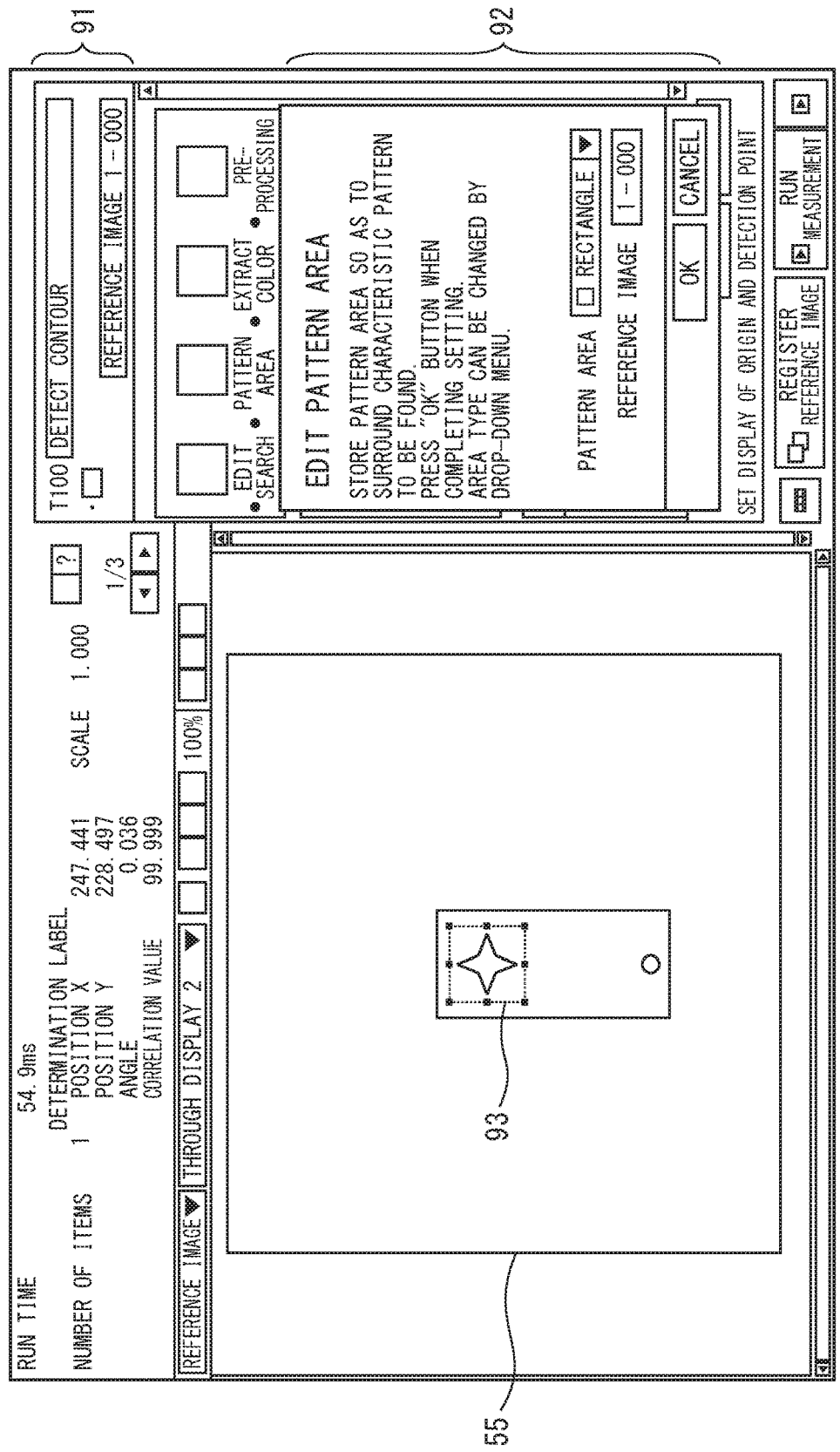
FIG. 9 is an illustrative view of a detection condition setting screen of the image processing apparatus according to the first embodiment of the present invention in the case of using a contour detection tool.
Figure 10:
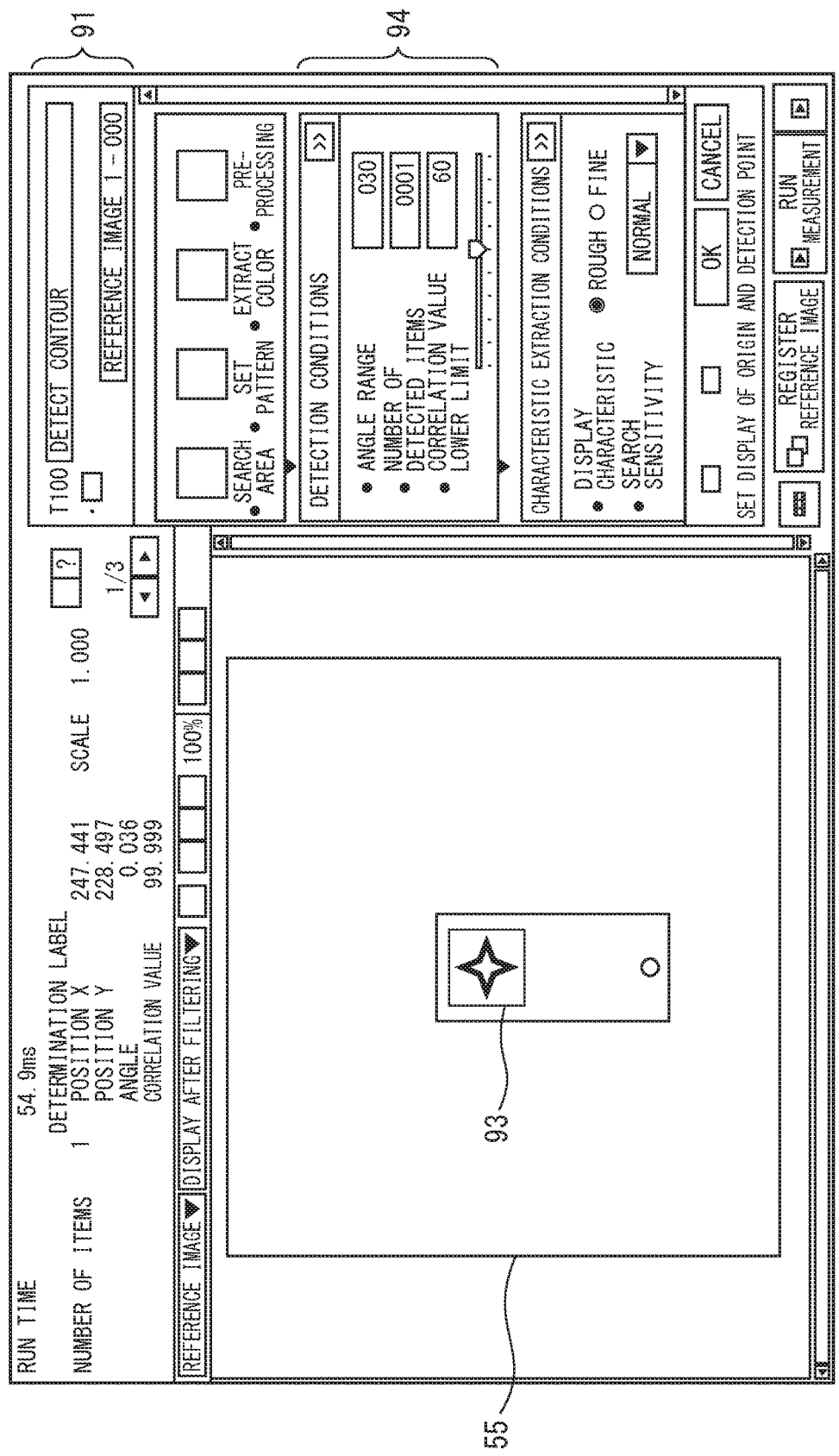
FIG. 10 is an illustrative view of a detection condition setting screen of the image processing apparatus according to the first embodiment of the present invention in the case of using a contour detection tool.

FIGS. 9 and 10 are illustrative views of a detection condition setting screen of the image processing apparatus 3 according to the first embodiment of the present invention in the case of using the contour detection tool. As shown in FIG. 9, the selected "contour detection tool" is displayed in a tool display area 91. Then, a shape of a contour pattern is set in a pattern editing area 92. In the example of FIG. 9, it has been set to a rectangular area.

Then, for the target displayed in the image display area 55, a detection area 93 for detecting a contour pattern is set while a drag operation is performed using the mouse or the like. In the example of FIG. 9, the area is set so as to surround the target, but the setting is not particularly restricted to such a setting.

When the detection area 93 is set, as shown in FIG. 10, detection conditions are set on a detection condition setting screen 94. Examples of the detection conditions include an "angle range" that is a permissible range of inclination of the target, the "number of detected items" showing the number of items to be detected, and a "correlation value lower limit" showing the degree of similarity to which the detection is performed.

Further, the shading detection tool may be selected as the detection tool. Even when the shading detection tool has been selected, the area to be detected needs to be set.

Figure 11:
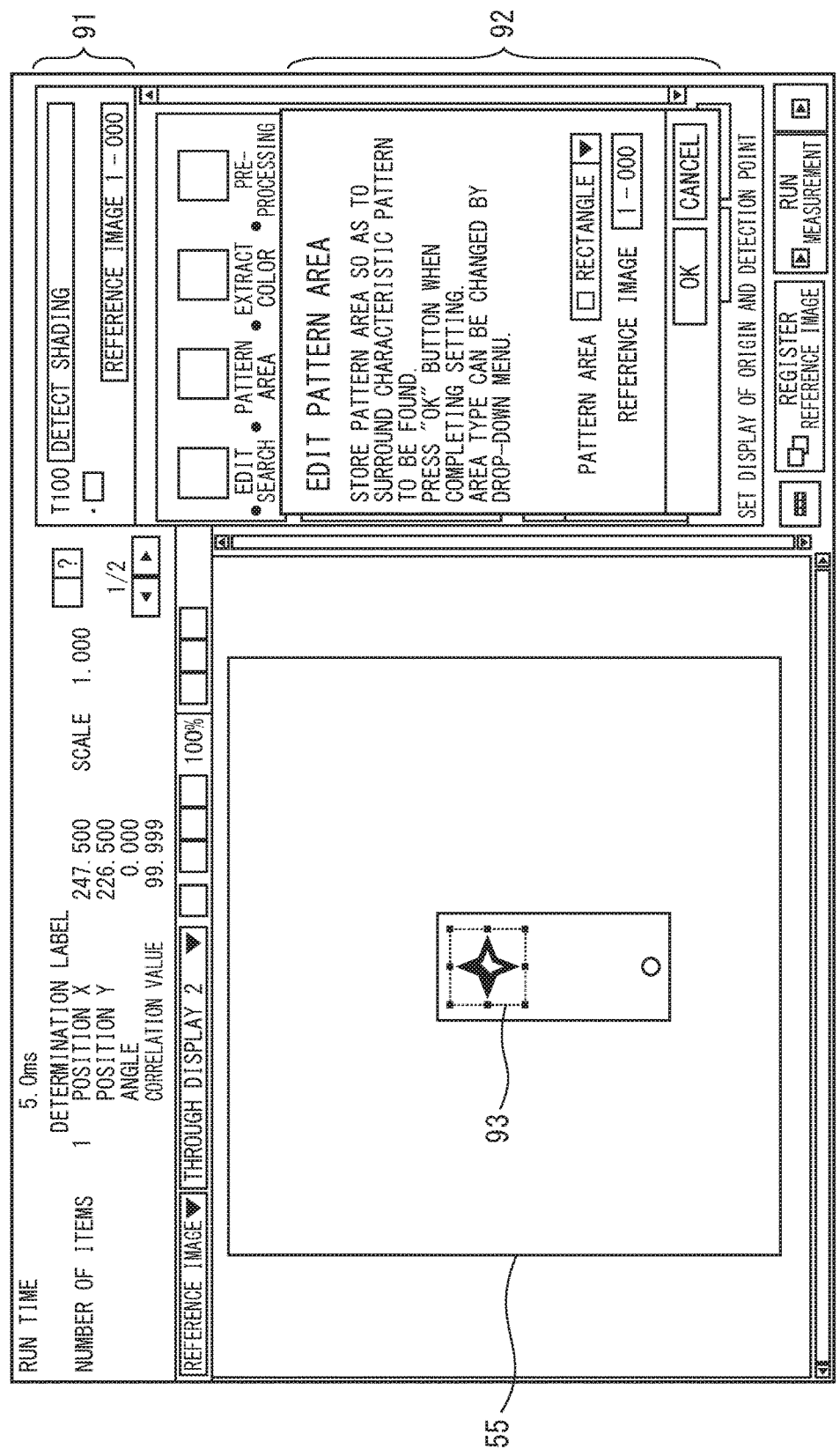
FIG. 11 is an illustrative view of the detection condition setting screen of the image processing apparatus according to the first embodiment of the present invention in the case of using a shading detection tool.
Figure 12:
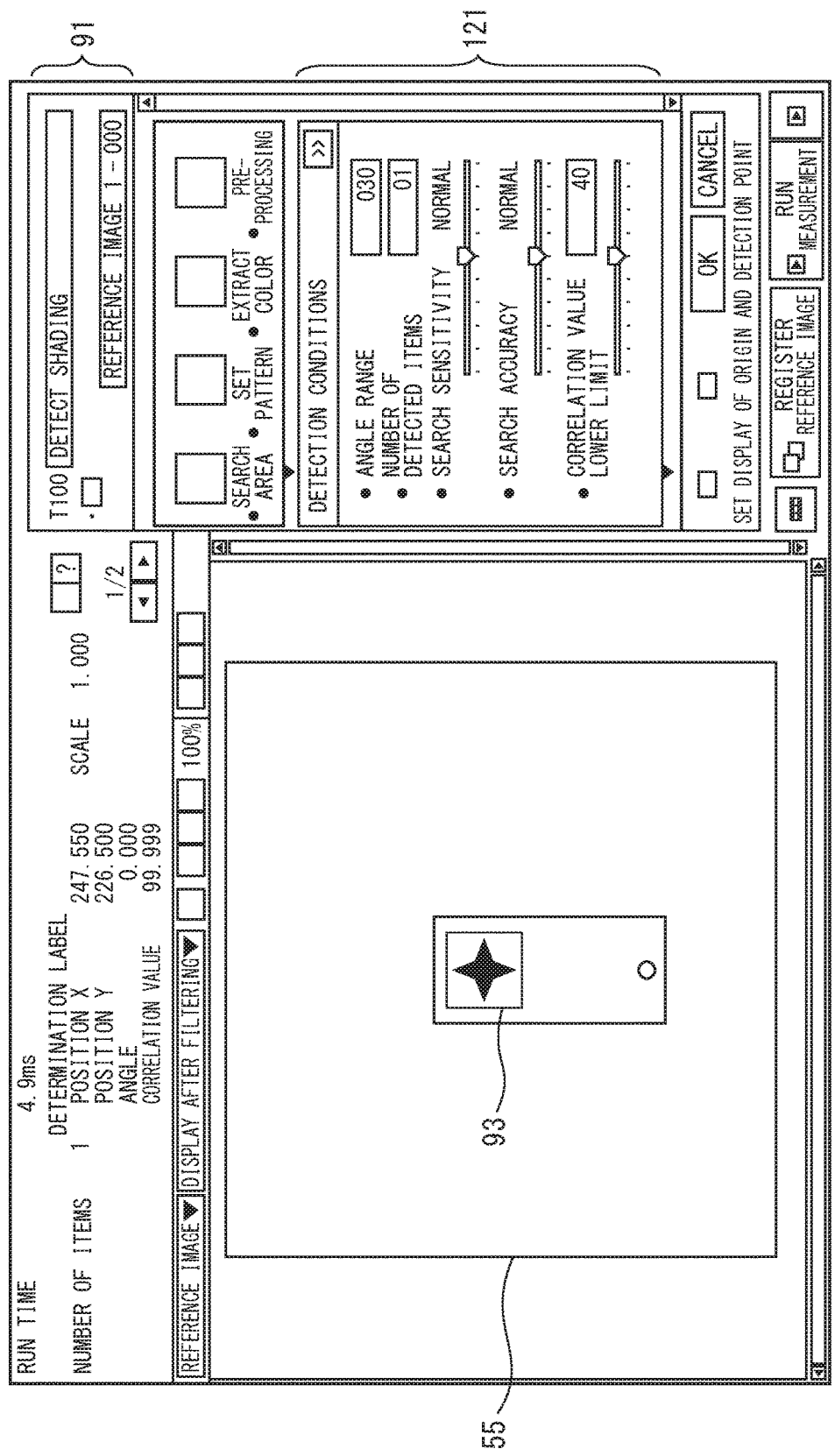
FIG. 12 is an illustrative view of the detection condition setting screen of the image processing apparatus according to the first embodiment of the present invention in the case of using a shading detection tool.

FIGS. 11 and 12 are illustrative views of the detection condition setting screen of the image processing apparatus 3 according to the first embodiment of the present invention in the case of using the shading detection tool. As shown in FIG. 11, the selected "shading detection tool" is displayed in the tool display area 91. Then, a shape of a contour pattern is set in a pattern editing area 92. In the example of FIG. 11, it has been set to a rectangular area.

Then, for the target displayed in the image display area 55, a detection area 93 for detecting a contour pattern is set while a drag operation is performed using the mouse or the like. In the example of FIG. 11, the area has been set so as to surround the target, but the setting is not particularly restricted to such a setting.

When the detection area 93 is set, as shown in FIG. 12, detection conditions are set in a detection condition setting area 121. Examples of the detection conditions include the "angle range" that is the permissible range of inclination of the target, the "number of detected items" showing the number of items to be detected, and the "correlation value lower limit" showing the degree of similarity to which the detection is performed, and other than those, it is also possible to set a detection sensitivity (search sensitivity) or detection accuracy (search accuracy). This is because there is assumed a case in which a shading difference or the like is different while the shape is the same.

Returning to FIG. 4, the image processing apparatus 3 determines whether or not the position coordinates (x, y) on the image have been detected for all of the position coordinates (x', y') for calibration (Step S412). When the image processing apparatus 3 determines that the position coordinates (x, y) on the image have not been detected for all of the position coordinates (x', y') (Step S412: NO), the image processing apparatus 3 issues the next movement command (Step S413) and returns the processing to Step S403, to repeat the foregoing processing.

When the image processing apparatus 3 determines that the position coordinates (x, y) on the image have been detected for all of the position coordinates (x', y') (Step S412: YES), the image processing apparatus 3 calculates a conversion formula in accordance with (Formula 1) (Step S414). Specifically, the six coefficients a, b, c, d, e, f are obtained.

Although the example of using the two-dimensional affine transformation as calibration has been described, a three-dimensional affine transformation may naturally be used.

Figure 13:
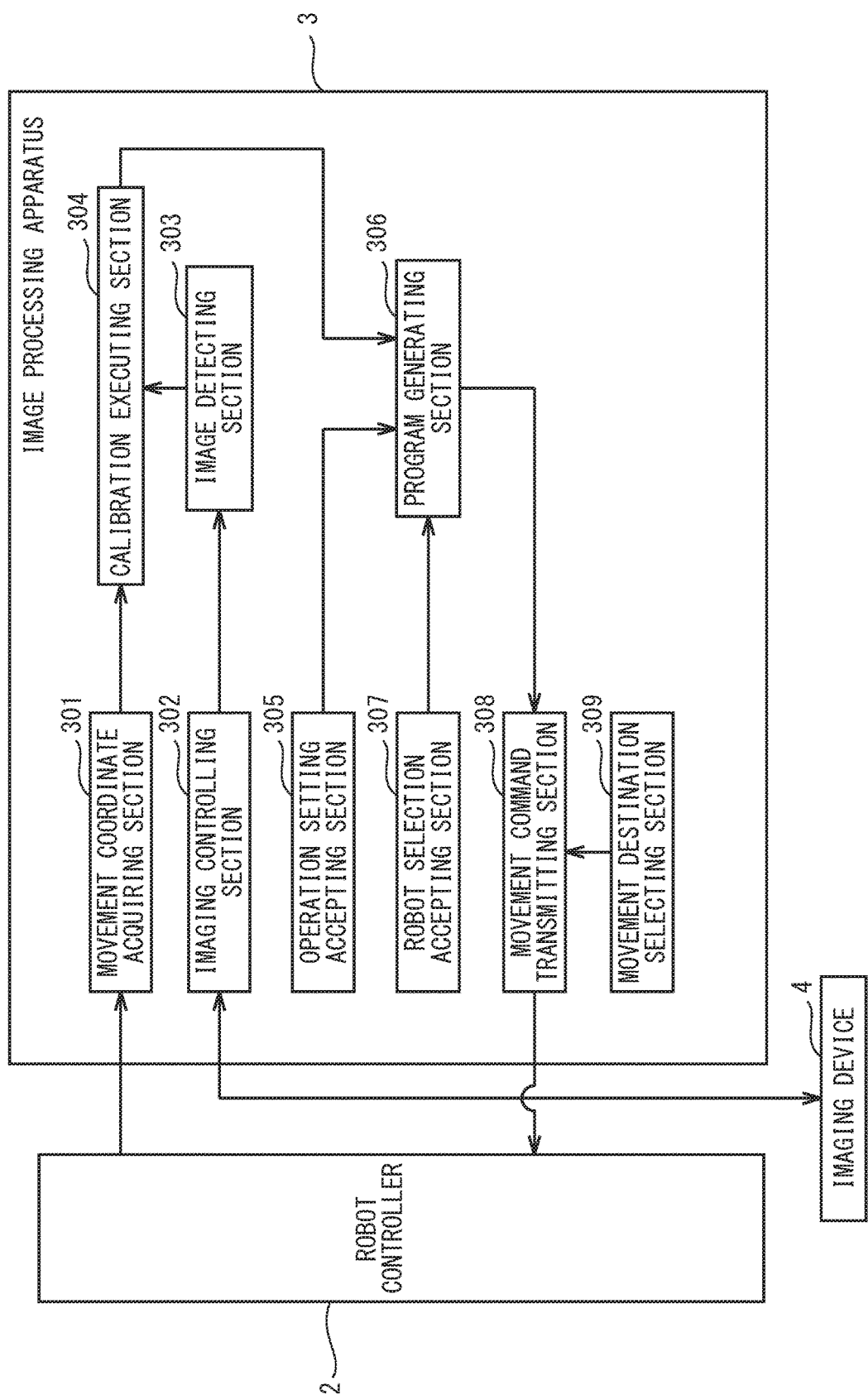
FIG. 13 is a functional block diagram of the image processing apparatus according to the first embodiment of the present invention.

FIG. 13 is a functional block diagram of the image processing apparatus 3 according to the first embodiment of the present invention. A movement coordinate acquiring section 301 of the image processing apparatus 3 acquires first coordinate values (x', y') that are each position coordinates of the end effector 5 moved in accordance with the movement command.

It is to be noted that the first coordinate values (x', y') acquired in the movement coordinate acquiring section 301 are coordinate values acquired from the robot controller 2 at each position to which the end effector 5 has moved in accordance with the movement command from the image processing apparatus 3. However, targeted movement coordinates of the manipulator (robot) 1 specified on the image displayed in the image processing apparatus 3 may be used as they are as the first coordinate values.

An imaging controlling section 302 controls an operation of the imaging device 4 so as to capture an image of the target at each movement destination, to which the end effector 5 has moved. Thus, the control is performed so as to capture an image of an area corresponding to the first coordinate values (x', y') that are the position coordinates of the end effector 5 at the movement destination acquired from the robot controller 2, thereby enabling execution of calibration with the acquired first coordinate values (x', y').

An image detecting section 303 detects the second coordinate values (x, y) being position the coordinates of the target based on the image of the target 6 captured at each movement destination. Based on the plurality of acquired first coordinate values (X', y') and the plurality of detected second coordinate values (x, y), a calibration executing section 304 calculates a conversion rule between both of the coordinates. For example, when two-dimensional calibration is to be executed, coordinate values are substituted into (Formula 1) described above, to obtain the coefficients a, b, d, e, f.

By executing calibration, it is not only possible to specify the first coordinate values (x', y') that are the position coordinates of the end effector 5 at the movement destination acquired from the robot controller 2 and transmit a movement command, but also possible to calculate the first coordinate values (x', y') from the second coordinate values (x, y) detected based on the image of the target 6 captured at each movement destination and transmit a movement command. That is, it is possible to transmit an operation command from the image processing apparatus 3 to the robot controller 2.

An operation setting accepting section 305 accepts selections of a plurality of operations which the robot controller 2 is made to execute out of a plurality of operations including at least an operation of moving the end effector 5 to the first coordinate values (x', y') or an operation of moving the end effector 5 to the second coordinate values (x, y) (specifically, an operation of moving to coordinate value obtained by conversion to the first coordinate values by use of a calibration result), and accepts a setting of an execution sequence of the plurality of operations, the selections of which have been accepted.

Figure 14A:
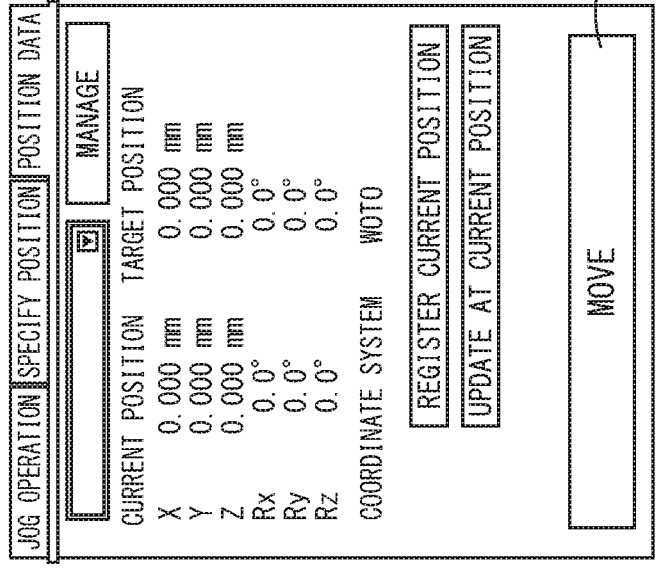
FIGS. 14A and 14B are illustrative views of a position data registration screen of the image processing apparatus according to the first embodiment of the present invention.
Figure 14B:
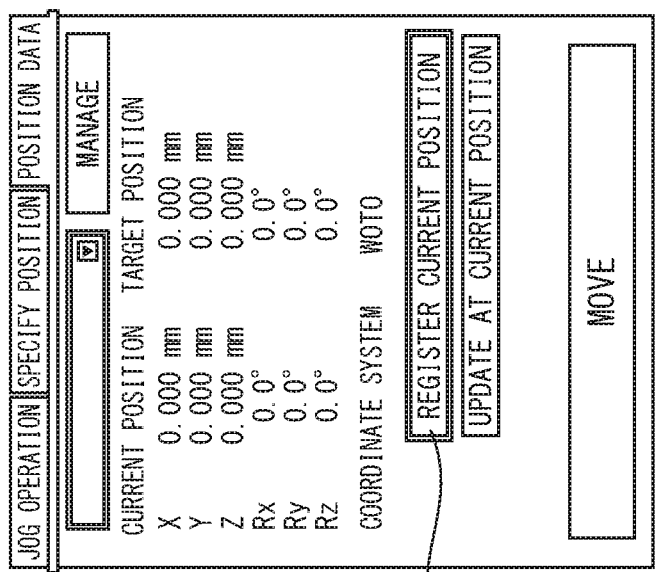

Specifically, first, position data of the movement destination is stored. FIGS. 14A and 14B are illustrative views of a position data registration screen of the image processing apparatus 3 according to the first embodiment of the present invention. First, the end effector 5 of the manipulator (robot) 1 is moved to the imaging position. A movement command is transmitted from the image processing apparatus 3 to the robot controller 2.

The position data of the end effector 5 is acquired as the first coordinate values (x', y') from the robot controller 2 by the movement coordinate acquiring section 301. FIG. 14A shows the acquired first coordinate values.

Then, a register button 141 is clicked by the mouse or the like, to store the acquired first coordinate values along with an identifier, e.g., "POS001". When any one set of first coordinate values is stored, a movement button 142 comes into a usable state as shown in FIG. 14B. The position data is selected and the movement button 142 is clicked by the mouse or the like, to allow transmission of the movement command.

Figure 15:
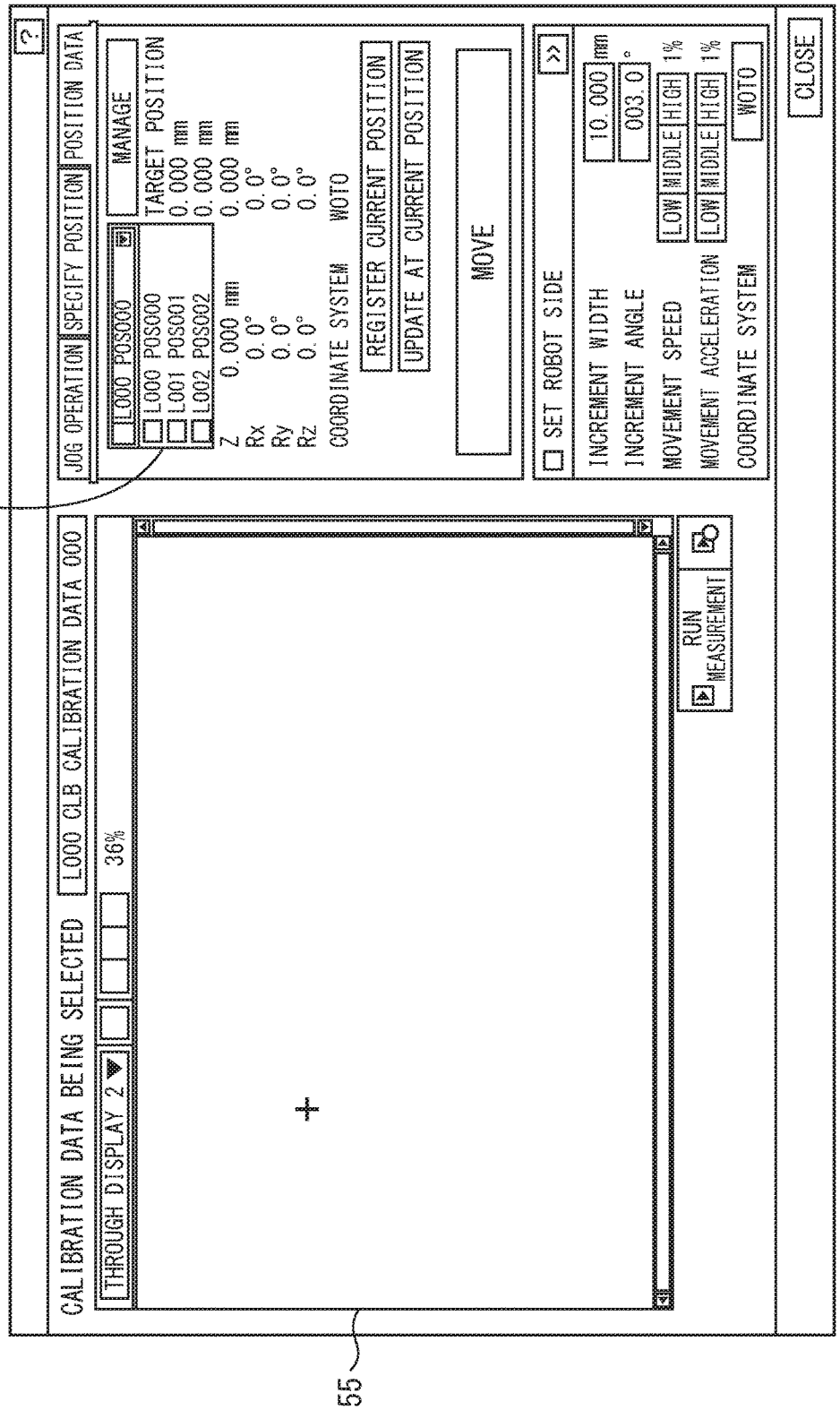
FIG. 15 is an illustrative view of a position data selection screen of the image processing apparatus according to the first embodiment of the present invention.

FIG. 15 is an illustrative view of a position data selection screen of the image processing apparatus 3 according to the first embodiment of the present invention. As shown in FIG. 15, already stored position data candidates are displayed in a position data selecting area 151. The user selects one piece of position data out of these candidates.

Figure 16:
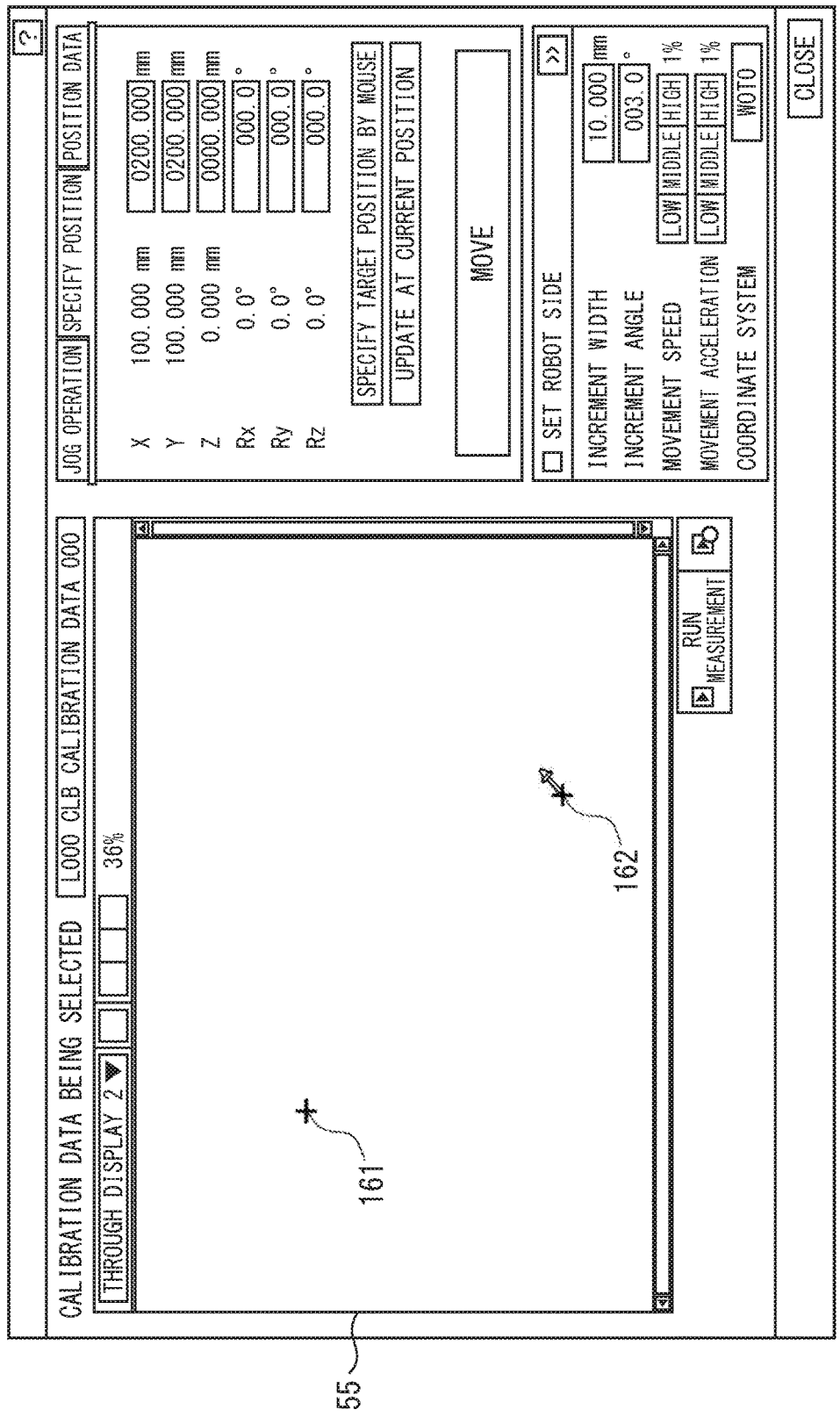
FIG. 16 is another illustrative view of the position data selection screen of the image processing apparatus according to the first embodiment of the present invention.

Further, the specification of the position may be accepted on the displayed image. FIG. 16 is another illustrative view of the position data selection screen of the image processing apparatus 3 according to the first embodiment of the present invention. In the example of FIG. 16, the position data selecting area 151 is not present. In the image display area 55 where the captured image is simply displayed, a current position is displayed with a "cross" mark 161. The user specifies a position "cross" mark 162 as a movement destination by a click operation of the mouse or the like.

That is, the position data selection screen functions as a movement destination selecting section 309 of FIG. 13. The movement destination selecting section 309 acquires a plurality of sets of first coordinate values of the end effector 5, and accepts a selection of one set of first coordinate values as the movement destination of the end effector 5 out of the plurality of sets of first coordinate values.

Returning to FIG. 13, the operation setting accepting section 305 accepts settings of operation conditions including at least a kind of operation and an operation sequence with respect to each imaging trigger which is received from the robot controller 2 and indicates timing for starting to capture the image of the target 6 by the imaging device 4. The image of the workpiece 6 is captured by the imaging device 4 at the timing when the operation conditions for each imaging trigger, the settings of which have been accepted, are received from the robot controller 2. There is no limits on what kind of information the imaging trigger should be. Any signal which at least informs the imaging device 4 of the timing for start to capture the image can serve as the imaging trigger.

The operation setting accepting section 305 may accept a setting of a standby command to the end effector 5. Accepting a setting of standby time until imaging can reduce vibration immediately after the operation and stabilize the position of the end effector 5 at the time of imaging. This can enhance the accuracy in detection in the state of the imaging device 4 being fixed to the end effector 5, or the accuracy in position detection in the state of the workpiece 6 being grasped by the end effector 5.

A program generating section 306 generates an operation program corresponding to each of the plurality of operations, the selections of which have been accepted in the operation setting accepting section 305, in accordance with the execution sequence the setting of which has been accepted. Specifically, each of the operation programs corresponding to the plurality of operations, the selections of which have been accepted, is generated as editable text data in accordance with the execution sequence the setting of which has been accepted.

In order to allow automatic generation of the operation program as well as free customization thereof by the user's intention, for example, the program generating section 306 generates operation programs concerning a series of plurality of operations including at least an operation of moving the end effector 5 to the first coordinate values or the second coordinate values and an operation of transmitting the imaging trigger out of the operations by the robot controller 2. Naturally, an operation program for establishing data communication with the robot controller 2 may be generated.

Further, since a format of the operation program varies by type of the manipulator (robot) 1, the program generating section 306 generates an operation program corresponding to each of the plurality of operations, the selections of which have been accepted in the operation setting accepting section 305, in accordance with the execution sequence the setting of which has been accepted.

Figure 17:
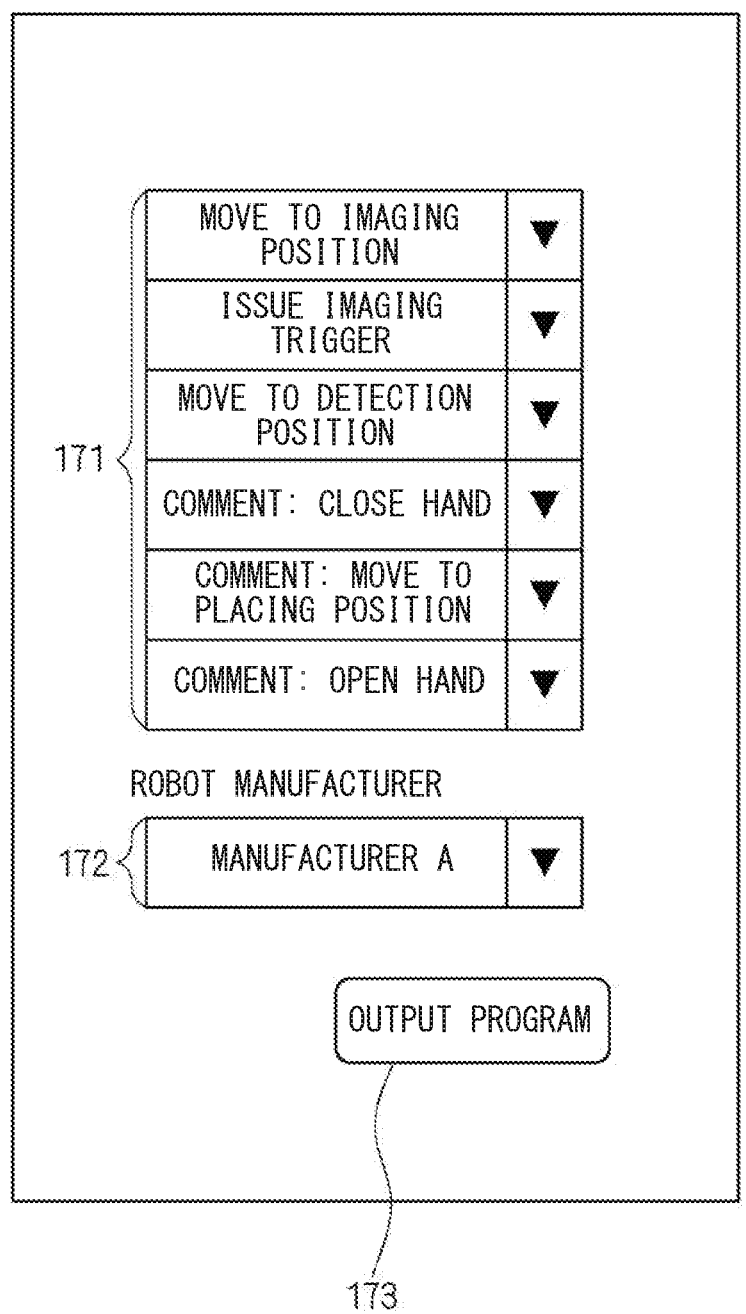
FIG. 17 is an illustrative view of a program generation screen of the image processing apparatus according to the first embodiment of the present invention.

FIG. 17 is an illustrative view of a program generation screen of the image processing apparatus 3 according to the first embodiment of the present invention. In FIG. 17, in a sequence selection area 171, there is displayed a list of operations which are candidates for operations to be incorporated into the operation program. The user selects an operation to be executed in the generated program out of the displayed operation list.

Further, a manufacturer having manufactured the manipulator (robot) 1 to become a target for control by the generated program is selected in a manufacturer selection area 172 (a robot selection accepting section 307). This is because specifications for the generated operation program vary among manufacturers. The robot selection accepting section 307 accepts a selection of the type of the robot, and the program generating section 306 generates an operation program in accordance with a format specified by type of the manipulator 1 the selection of which has been accepted.

Herein, it is only the operations (hereinafter referred to as general operations) such as movement of the end effector 5 and the transmission of the imaging trigger that can be selected out of the operation list. Operations that cannot be selected are detailed operations (picking, releasing, etc.) of the end effector 5 and operations of other connected external equipment (hereinafter referred to as special operations). As part of the operation program, first, only portions corresponding to the general operations are automatically generated in an editable form. Then, the user eventually edits portions corresponding to the special operations, to allow completion of the operation program.

Figures 18, 19:
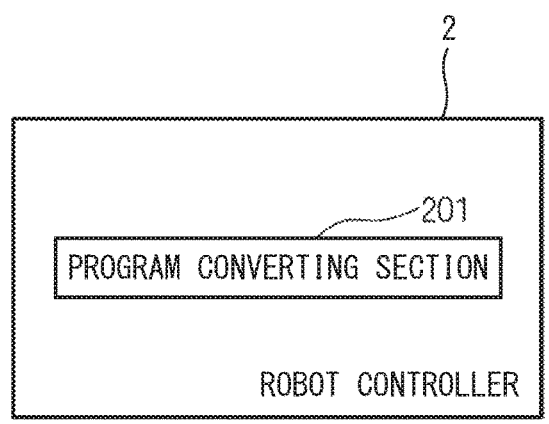
FIG. 18 is an illustrative view of the operation program for the robot controller according to the first embodiment of the present invention.
FIG. 19 is a functional block diagram of a robot controller according to the first embodiment of the present invention.

With all the settings having been completed, a program output button 173 is clicked by the mouse or the like, to generate an operation program for the robot controller 2. FIG. 18 is an illustrative view of the operation program for the robot controller 2 according to the first embodiment of the present invention.

As shown in FIG. 18, a source code 181 is a command to establish data communication with the image processing apparatus 3. A source code 182 is a command to retract the imaging device 4. A source code 183 is a coordinate value acquirement command to the image processing apparatus 3.

A source code 184 is a command to receive coordinate values from the image processing apparatus 3. A source code 185 is a command to convert the received position coordinates to actual position coordinates of the manipulator 1.

A source code 186 is a command to move the end effector 5 of the manipulator 1 to the final position of movement. A source code 187 is a comment field, and the user can describe a source code therein by himself or herself, to generate an operation program further according to the user's need. A source code 188 is a command to cancel data communication with the image processing apparatus 3.

Returning to FIG. 13, a movement command transmitting section 308 transmits, to the robot controller 2, a movement command to move the end effector 5 to the first coordinate values or the second coordinate values. It is to be noted that, when the specification of the position information of the movement destination is accepted as shown in FIG. 16, a movement command to move the end effector 5 to the position, the specification has been accepted on the image, is transmitted to the robot controller 2.

Moreover, the robot controller 2 needs to convert the movement command in accordance with the type of the manipulator (robot) 1 that controls the motion. FIG. 19 is a functional block diagram of the robot controller 2 according to the first embodiment of the present invention.

As shown in FIG. 19, the robot controller 2 is provided with a program converting section 201. The program converting section 201 is provided for each type of the manipulator (robot) 1, and converts the movement command to a movement command to the end effector 5 in accordance with the type of the manipulator 1. Hence it is possible to install a conversion program in accordance with the type of the manipulator 1 to be used in the robot controller 2, and convert the movement command to the movement command to the end effector 5 in accordance with the type of the manipulator 1.

Figure 20:
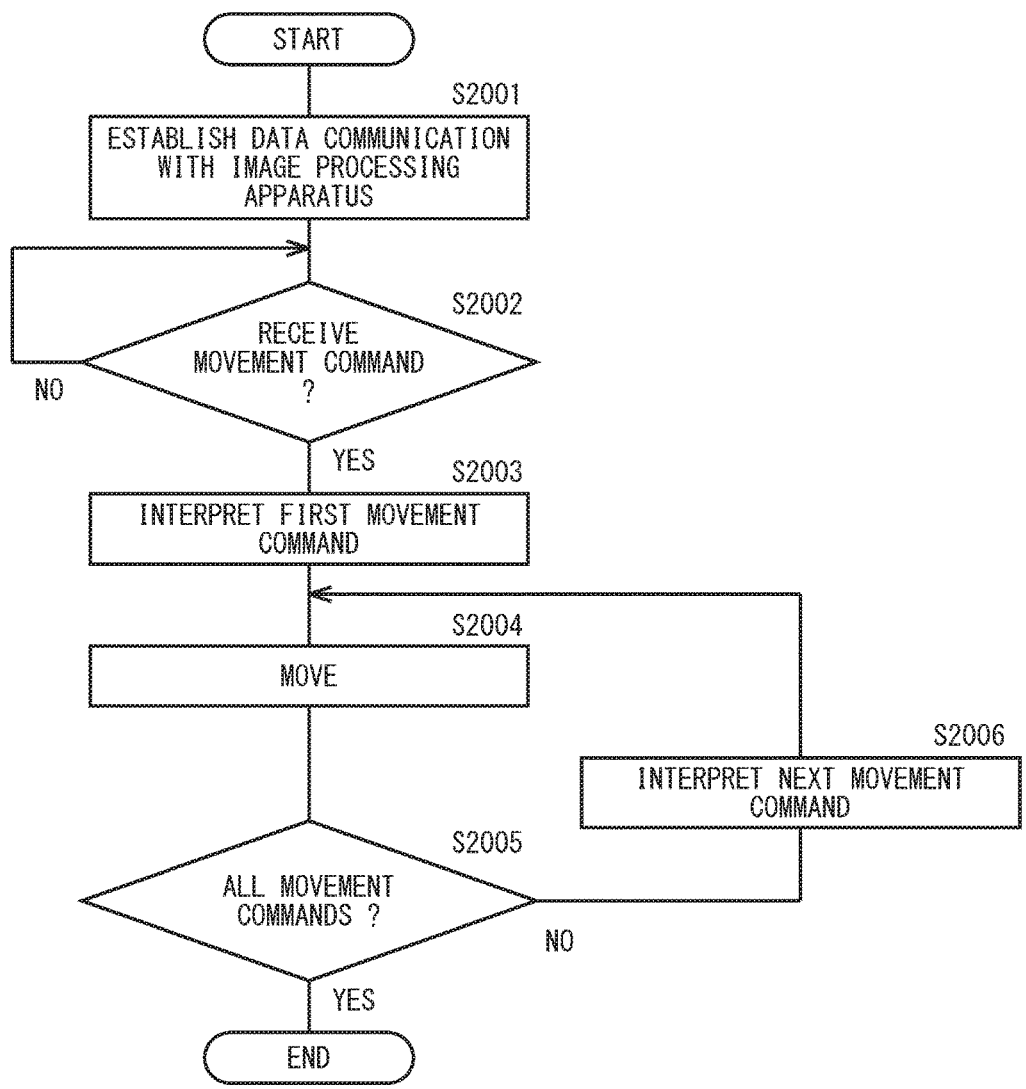
FIG. 20 is a flowchart showing a processing procedure for a conversion program for the robot controller according to the first embodiment of the present invention.

FIG. 20 is a flowchart showing a processing procedure for the conversion program for the robot controller 2 according to the first embodiment of the present invention. As shown in FIG. 20, the robot controller 2 establishes data communication with the image processing apparatus 3 (Step S2001), and determines whether or not the movement command has been received (Step S2002).

When determining that the movement command has not been received (Step S2002: NO), the robot controller 2 comes into a reception standby state. When determining that the movement command has been received (Step S2002: YES), the robot controller 2 interprets the first movement command (Step S2003).

The robot controller 2 switches the movement command in accordance with contents of the interpreted movement command, and moves the converted command to the end effector 5 of the manipulator 1 (Step S2004). The robot controller 2 determines whether or not to have interpreted all movement commands (Step S2005).

When determining that some movement command has not been interpreted (Step S2005: NO), the robot controller 2 interprets the next movement command (Step S2006), and returns the processing to Step S2004, to repeat the foregoing processing. When determining that all the movement commands have been interpreted (Step S2005: YES), the robot controller 2 ends the processing.

Figure 21:
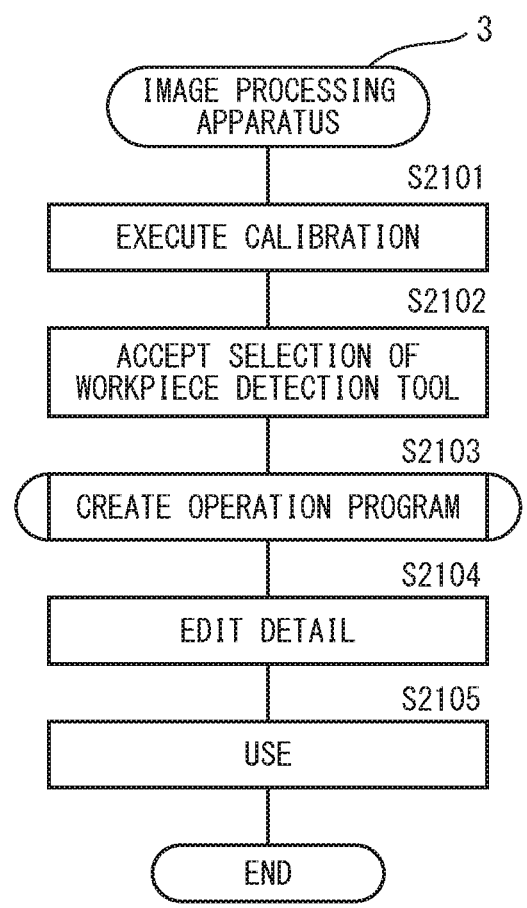
FIG. 21 is a flowchart showing a system building procedure for an image processing system according to the first embodiment of the present invention.

FIG. 21 is a flowchart showing a system building procedure for the image processing system according to the first embodiment of the present invention. As shown in FIG. 21, the image processing apparatus 3 executes calibration shown in FIG. 4 (Step S2101), to obtain a conversion formula for position coordinates.

The image processing apparatus 3 accepts a selection of a detection tool for detecting the workpiece 6 (Step S2102). Specifically, the detection tool is selected in a detection tool selecting area 61 on the detection tool setting screen shown in FIG. 6.

The image processing apparatus 3 creates an operation program (Step S2103). The image processing apparatus 3 edits a detail of a sample program for which an operation has been checked by a test operation (Step S2104), and shifts to a stage to use the program (Step S2105).

Figure 22:
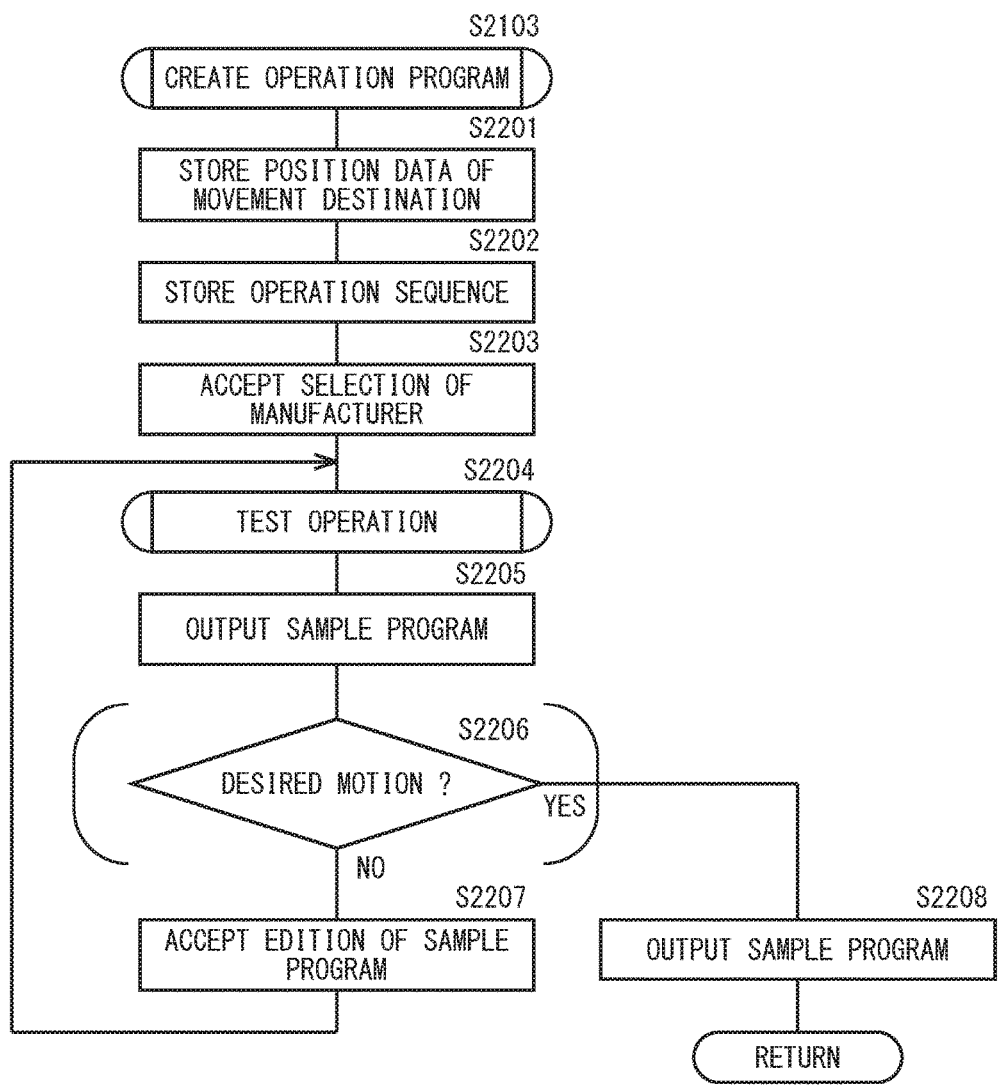
FIG. 22 is a flowchart showing a processing procedure for creation of an operation program for the image processing apparatus according to the first embodiment of the present invention.

FIG. 22 is a flowchart showing a processing procedure for creation of an operation program for the image processing apparatus 3 according to the first embodiment of the present invention. As shown in FIG. 22, the image processing apparatus 3 stores one or more position data of the movement destinations (Step S2201).

The image processing apparatus 3 stores an operation sequence being an execution sequence of operations (Step S2202), and accepts a selection of a manufacturer of the manipulator (robot) 1 (Step S2203). For example in the sequence selection area 171 on the program generation screen shown in FIG. 17, the processing (movement) to be executed is selected in descending order of desire for execution from pull-down menu. Further, the manufacturer is selected in the manufacturer selection area 172 on the program generation screen shown in FIG. 17.

The image processing apparatus 3 performs a test operation (Step S2204), and outputs a sample program at that point (Step S2205). That is, a motion cannot be checked unless its program has been completed in the conventional technique, whereas the present application is characterized in that it is possible to consider into detail of a program while checking by a test operation as to whether or not a basic motion is correct.

The user determines whether or not the motion of the manipulator (robot) 1 is a desired motion (Step S2206), and when the user determines that it is not the desired motion (Step S2206: NO), the image processing apparatus 3 accepts edition of a sample program (Step S2207) and returns the processing to Step S2204, to repeat the foregoing processing. When the user determines that it is the desired motion (Step S2206: YES), the image processing apparatus 3 accepts a request for transmitting the sample program, and outputs a source code of the sample program as text data (Step S2208).

Figure 23A:
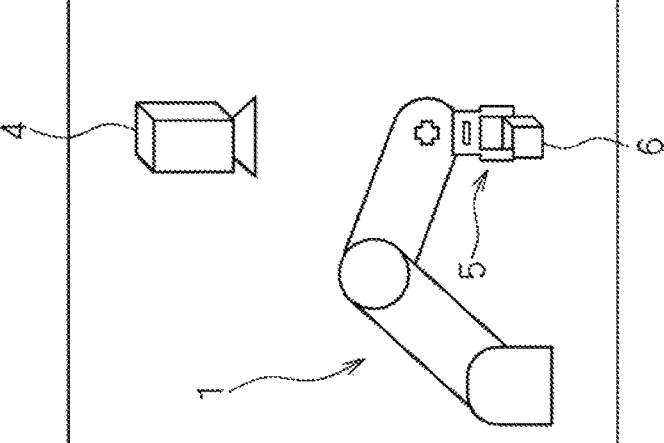
FIGS. 23A to 23C are schematic views for explaining motions during a test operation in the image processing system according to the first embodiment of the present invention.
Figure 23B:
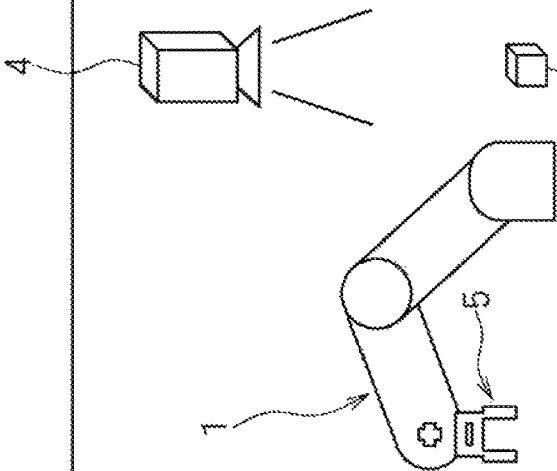
Figure 23C:
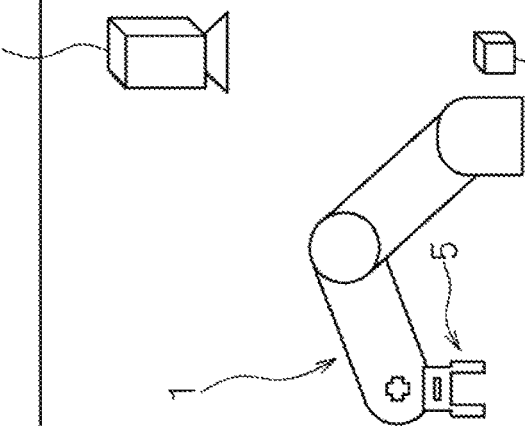

The motion of the manipulator (robot) 1 during the test operation is not particularly restricted. FIGS. 23A to 23C are schematic views for explaining the motions during the test operation in the image processing system according to the first embodiment of the present invention.

First, as shown in FIG. 23A, in order to allow the image of the workpiece 6 to be captured, the image processing system according to the present first embodiment moves the end effector 5 of the manipulator 1 to a position "POS000" different from a position at which the workpiece 6 is placed. In this state, as shown in FIG. 23B, the image of the workpiece 6 is captured in accordance with the imaging trigger. Lastly, as shown in FIG. 23C, the end effector 5 of the manipulator 1 is moved to the position (detection position) at which the workpiece 6 is placed, so as to grasp the workpiece 6.

Figure 24:
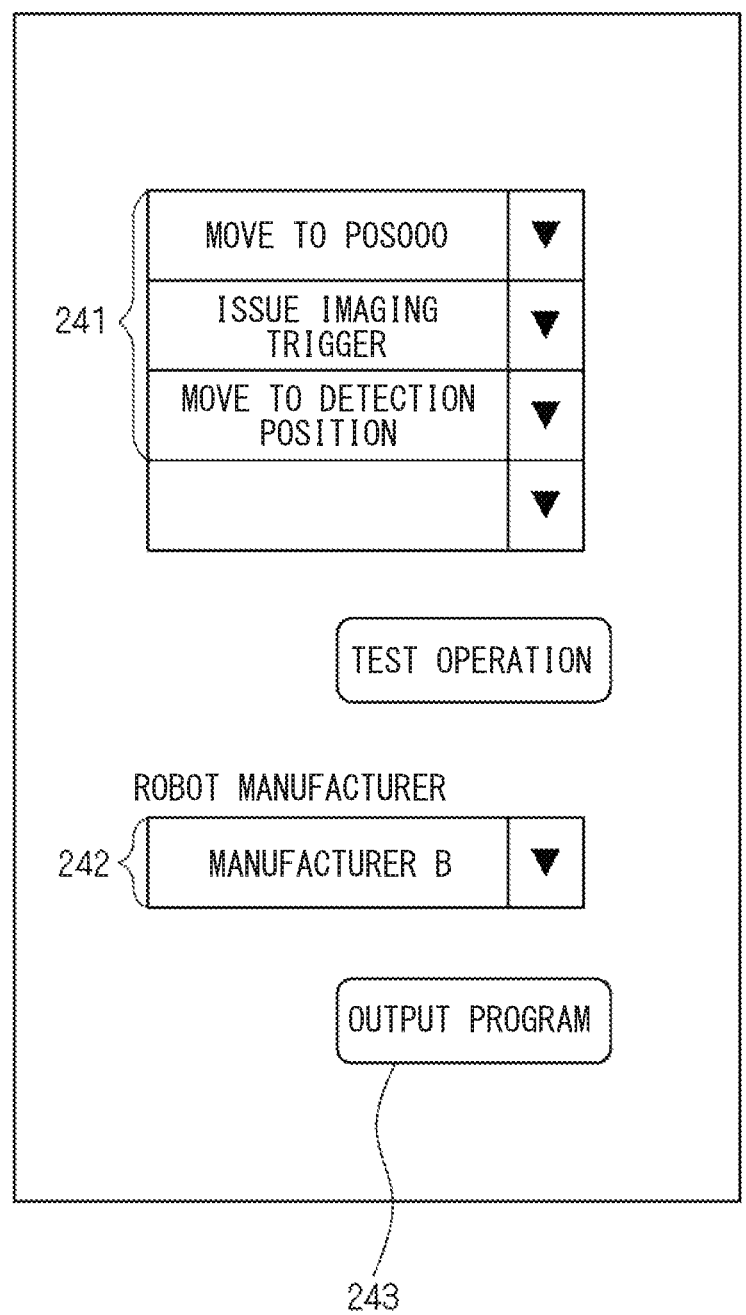
FIG. 24 is an illustrative view of a program generation screen of the image processing apparatus according to the first embodiment of the present invention.

The operation program executed in the robot controller 2 can be easily generated from the program generation screen so as to make the manipulator (robot) 1 take the above motion. FIG. 24 is an illustrative view of a program generation screen of the image processing apparatus 3 according to the first embodiment of the present invention.

In FIG. 24, in a sequence selection area 241, processing (operation) to be executed by a generated program is selected from a pulldown menu. Further, a manufacturer having manufactured the manipulator (robot) 1 to become a target for control by the generated program is selected in a manufacturer selection area 242. This is because specifications for the generated program vary among manufacturers.

In the example of FIG. 24, a specification is made to generate a program for controlling motions of moving to previously registered position coordinates ("POS000" is used as an identifier in FIG. 24), issuing an imaging trigger that indicates the timing for starting to capture the image, and moving to a position for grasping the workpiece 6. At the point of completion of all specifications, a program output button 243 is clicked by the mouse or the like, to generate an operation program for the robot controller 2.

Figure 25:
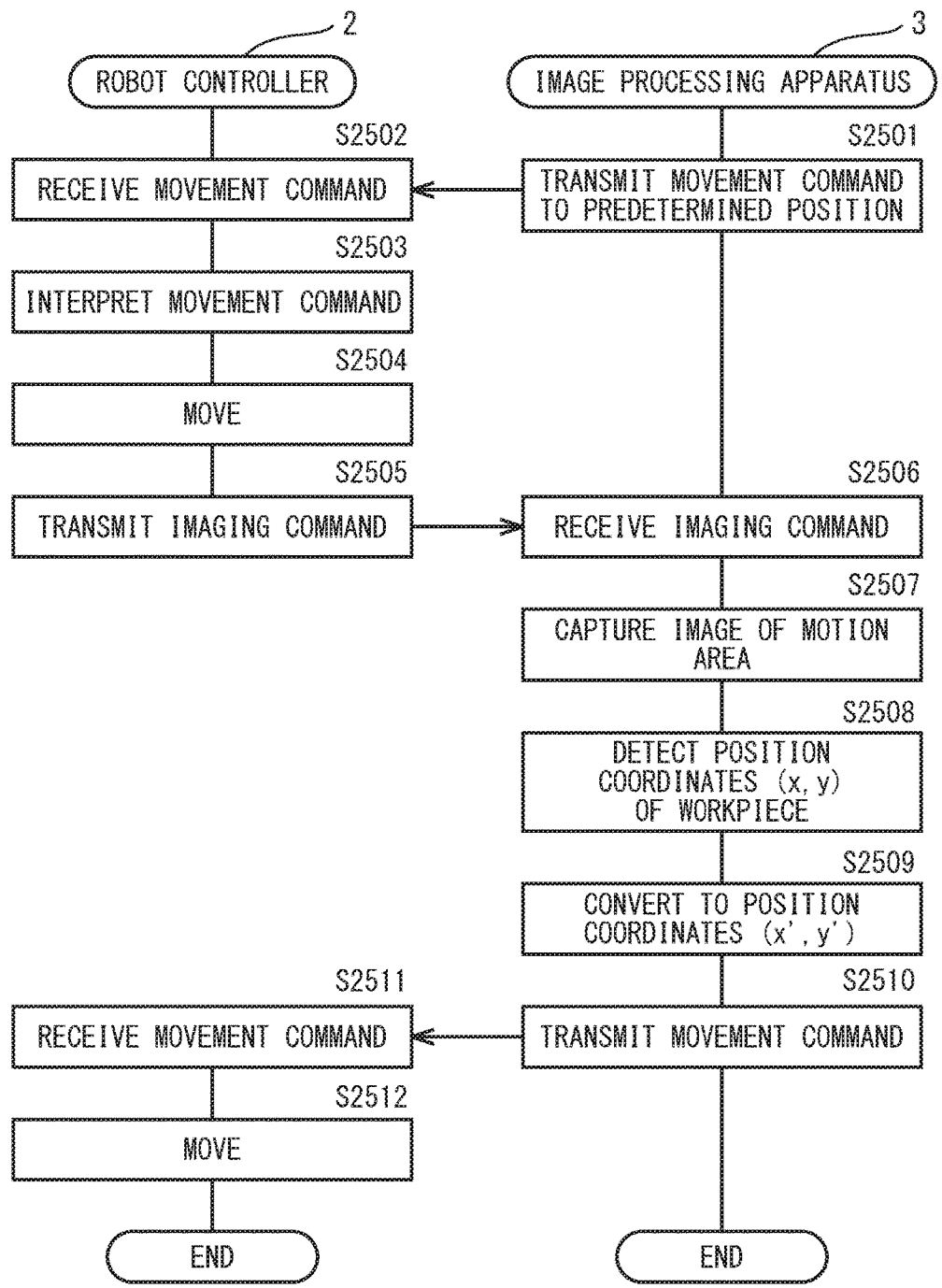
FIG. 25 is a flowchart showing a processing procedure during the test operation of the image processing system according to the first embodiment of the present invention.

FIG. 25 is a flowchart showing a processing procedure during the test operation of the image processing system according to the first embodiment of the present invention. As shown in FIG. 25, the image processing apparatus 3 transmits a command to move to a predetermined position ("POS000" in the example of FIG. 24) to the robot controller 2 (Step S2501).

The robot controller 2 receives the movement command from the image processing apparatus 3 (Step S2502), and interprets the movement command in accordance with the type of the manipulator 1 (Step S2503). That is, the command is translated to a load module in machine language that can activate the manipulator 1.

The robot controller 2 moves the end effector 5 to the position specified by the movement command ("POS000" in the example of FIG. 24) (Step S2504), and transmits an imaging command to the image processing apparatus 3 (S2505).

The image processing apparatus 3 receives the imaging command (Step S2506), and captures an image of a motion area of the end effector 5 (Step S2507). The image processing apparatus 3 displays the image of the motion area of the end effector 5, detects position coordinates (x, y) of the workpiece 6 on the displayed image (Step S2508), and converts them to position coordinates (x', y') by use of the conversion formula previously obtained by calibration (Step S2509).

The image processing apparatus 3 transmits a movement command to the position coordinates (x', y') to the robot controller 2 (Step S2510). The robot controller 2 receives the movement command (Step S2511), and moves the end effector 5 to the converted position coordinates (x', y') (Step S2512).

It is to be noted that two execution modes are preferably prepared in advance for execution of the test operation. For example, one mode is a "teaching mode", and the other mode is an "automatic operation mode".

The "teaching mode" is a mode for the user to update a sample program while checking a motion. Since the user is likely to be working in the vicinity of the manipulator 1, its motion is limited to a low-speed motion for ensuring the security, and it is set such that the manipulator 1 does not take a motion unless a certain switch intentionally remains pressed down.

Further, in the "automatic operation mode", there is no motion limit as in the "teaching mode". Instead of this, in order to ensure the security of the user, it is necessary to take a measure such as a measure of making the manipulator 1 take no motion in a case where a human sensor detects the presence of a human within a predetermined area. At the time of executing calibration, the user is likely to be in the vicinity of the manipulator 1, and hence it is preferable to add a limit function in the robot controller 2 in which the manipulator 1 can take a motion only in the "teaching mode".

As described above, according to the first embodiment, the operation program for the robot controller 2 to control the motion of the manipulator (robot) 1 from the image processing apparatus 3 can be generated in the image processing apparatus 3. Hence it is possible to create an operation program that allows even the worker (user), who does not understand machine language which varies by type of the manipulator 1, to control the motion of the manipulator 1 with high accuracy. This eliminates the need for a complex procedure for checking motions every time all operation programs are completed, thus allowing the program to start up as a system in an early stage.

Second Embodiment

A configuration of an image processing system and a configuration of the image processing apparatus 3 according to a second embodiment of the present invention are similar to those of the first embodiment. Hence constituents having the same functions are provided with the same numerals, and detailed descriptions thereof are thereby omitted. The present second embodiment is different from the first embodiment in generating an operation program capable of switching the operation by switching the setting condition.

Figure 26:
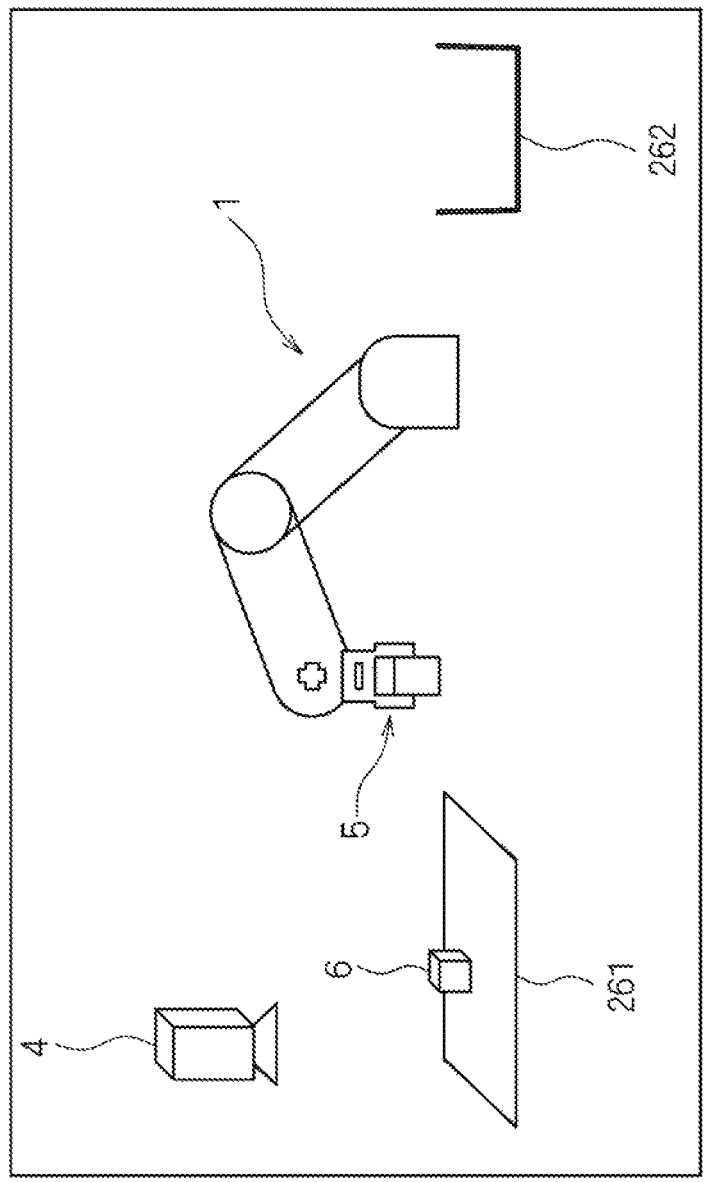
FIG. 26 is a schematic view for explaining execution of picking in an image processing system according to a second embodiment of the present invention.

In the second embodiment, a description will be given by taking picking of the workpiece 6 as an example. FIG. 26 is a schematic view for explaining execution of picking in the image processing system according to the second embodiment of the present invention. As shown in FIG. 26, in the image processing system according to the present second embodiment, the workpiece 6 is moved from a pickup position 261 to a placing position 262. Specifically, while the image of the workpiece 6 at the pickup position 261 is captured by the imaging device 4, the workpiece 6 is grasped by the end effector 5 of the manipulator 1, moved to the placing position 262, and then released.

Figure 27:
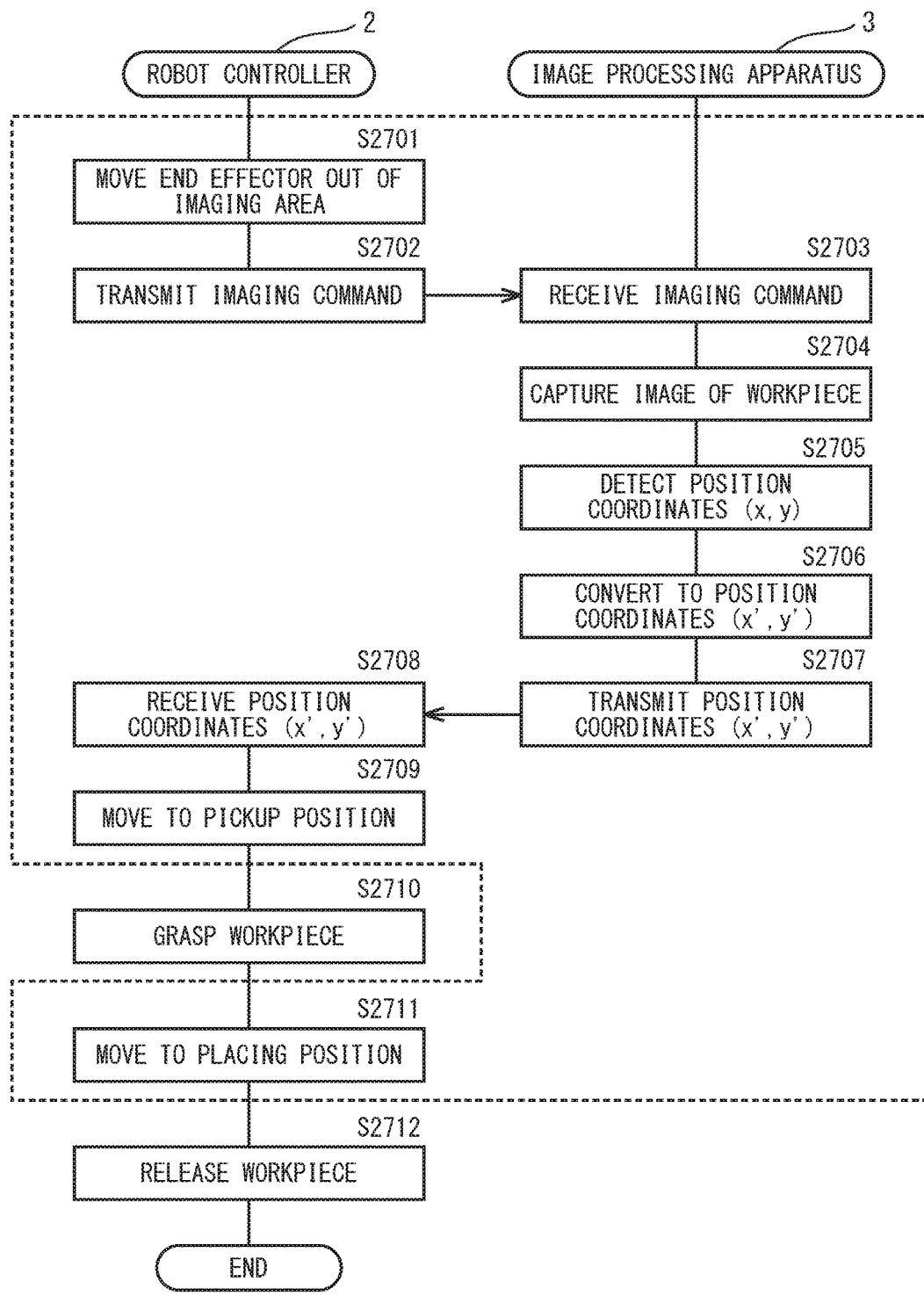
FIG. 27 is a flowchart showing a processing procedure for picking in the image processing system according to the second embodiment of the present invention.

FIG. 27 is a flowchart showing a processing procedure for picking in the image processing system according to the second embodiment of the present invention. As shown in FIG. 27, the robot controller 2 moves the end effector 5 of the manipulator 1 out of an imaging area in order to avoid a situation in which the end effector 5 of the manipulator 1 prevents the imaging device 4 from capturing the image of the workpiece 6 that is the imaging target (Step S2701).

The robot controller 2 transmits an imaging command to the image processing apparatus 3 (Step S2702). The image processing apparatus 3 receives the imaging command (Step S2703), and captures the image of the workpiece 6 (Step S2704). The image processing apparatus 3 displays the image of the workpiece 6, detects position coordinates (x, y) of the workpiece 6 on the displayed image (Step S2705), and converts them to position coordinates (x', y') by use of the conversion formula previously obtained by calibration (Step S2706). The image processing apparatus 3 transmits the converted position coordinates (x', y') to the robot controller 2 (Step S2707).

The robot controller 2 receives the position coordinates (x', y') (Step S2708), and moves the end effector 5 to the pickup position 261 for grasping the workpiece 6 (Step S2709). The robot controller 2 makes the end effector 5 grasp the workpiece 6 (Step S2710).

The robot controller 2 makes the end effector 5 move to the placing position 262 while grasping the workpiece 6 (Step S2711), and release the workpiece 6 (Step S2712). In addition, it is possible to automatically generate an operation program for controlling the motion of the manipulator 1 by the processing other than the processing in a range surrounded by a dotted line, namely Step S2710 and Step S2712.

Figure 28:
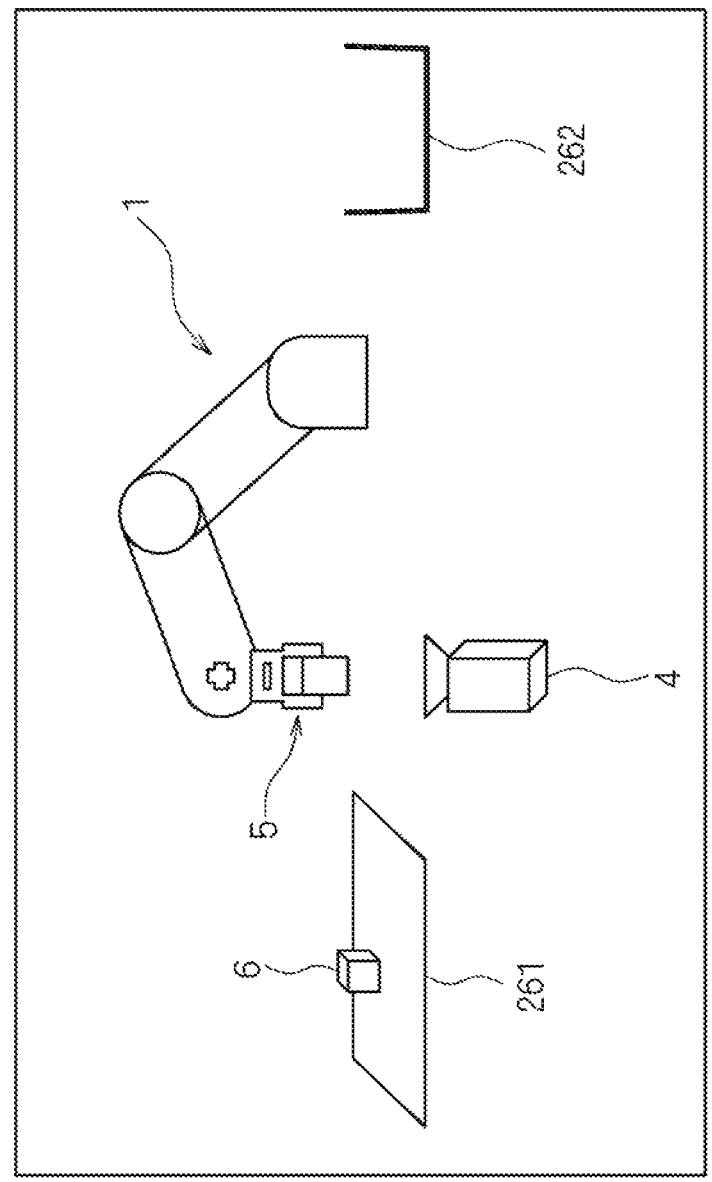
FIG. 28 is a schematic view for explaining execution of picking in the image processing system according to the second embodiment of the present invention in the case of correcting the imaging position.

There may be cases where the imaging position needs to be corrected due to displacement of the position at which the end effector 5 has grasped the workpiece 6. FIG. 28 is a schematic view for explaining execution of picking in the image processing system according to the second embodiment of the present invention in the case of correcting the imaging position.

As shown in FIG. 28, in the image processing system according to the present second embodiment, the workpiece 6 is moved from the pickup position 261 to the placing position 262. Differently from FIG. 26, the image of the workpiece 6 is captured by the imaging device 4, with the workpiece 6 being grasped by the end effector 5 of the manipulator 1 and moving to the placing position 262. That is, the position at which the workpiece 6 is present is mechanically displaced at the point when the workpiece 6 is grasped by the end effector 5 of the manipulator 1. Hence, the image processing system corrects the displacement of the imaging position.

Figure 29:
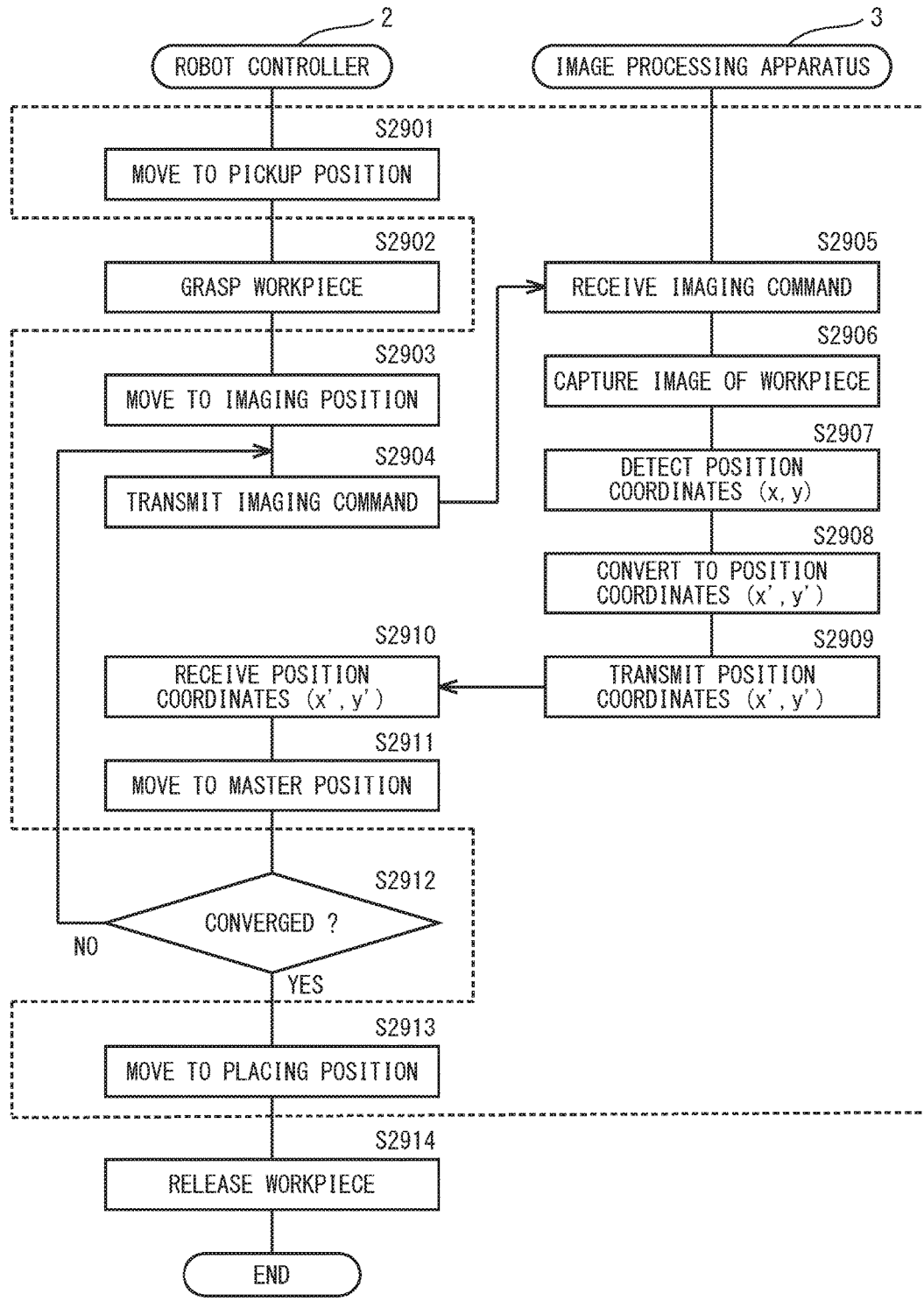
FIG. 29 is a flowchart showing a processing procedure for picking in the image processing system according to the second embodiment of the present invention in the case of correcting the imaging position.

FIG. 29 is a flowchart showing a processing procedure for picking in the image processing system according to the second embodiment of the present invention in the case of correcting the imaging position. As shown in FIG. 29, the robot controller 2 moves the end effector 5 of the manipulator 1 to the pickup position 261 (Step S2901).

The robot controller 2 grasps the workpiece 6 (Step S2902), and moves the workpiece 6 grasped by the end effector 5 of the manipulator 1 to a position at which its image is to be captured by the imaging device 4 (Step S2903). The robot controller 2 transmits an imaging command to the image processing apparatus 3 (Step S2904).

The image processing apparatus 3 receives the imaging command (Step S2905), and captures the image of the workpiece 6 (Step S2906). The image processing apparatus 3 displays the image of the workpiece 6, detects position coordinates (x, y) of the workpiece 6 on the displayed image (Step S2907), and converts them to position coordinates (x', y') by use of the conversion formula previously obtained by calibration (Step S2908). The image processing apparatus 3 transmits the converted position coordinates (x', y') to the robot controller 2 (Step S2909).

The robot controller 2 receives the position coordinates (x', y') (Step S2910), and moves the end effector 5 to the position coordinates specified by the movement command (Step S2911). The robot controller 2 determines whether or not the position coordinates (x', y') have converged to the position coordinates specified by the movement command within a certain range (Step S2912).

When the robot controller 2 determines that the position coordinates (x', y') have not converged to the position coordinates specified by the movement command within the certain range (Step S2912: NO), the robot controller 2 returns the processing to Step S2904, to repeat the foregoing processing. When the robot controller 2 determines that the position coordinates (x', y') have converged to the position coordinates specified by the movement command within the certain range (Step S2912: YES), the robot controller 2 makes the end effector 5 move to the placing position 262 while grasping the workpiece 6 (Step S2913), and release the workpiece 6 (Step S2914). In addition, it is possible to automatically generate an operation program for controlling the motion of the manipulator 1 by the processing other than the processing in a range surrounded by a dotted line, namely Step S2902, Step S2912 and Step S2914.

Also with regard to execution of picking, when the condition is changed, the operation program to be generated changes. It is preferable to switch the operation program in association with a difference in condition, such as a difference in imaging position, a difference in position detected from the image or a difference in manufacturer of the manipulator 1.

Figure 30A:
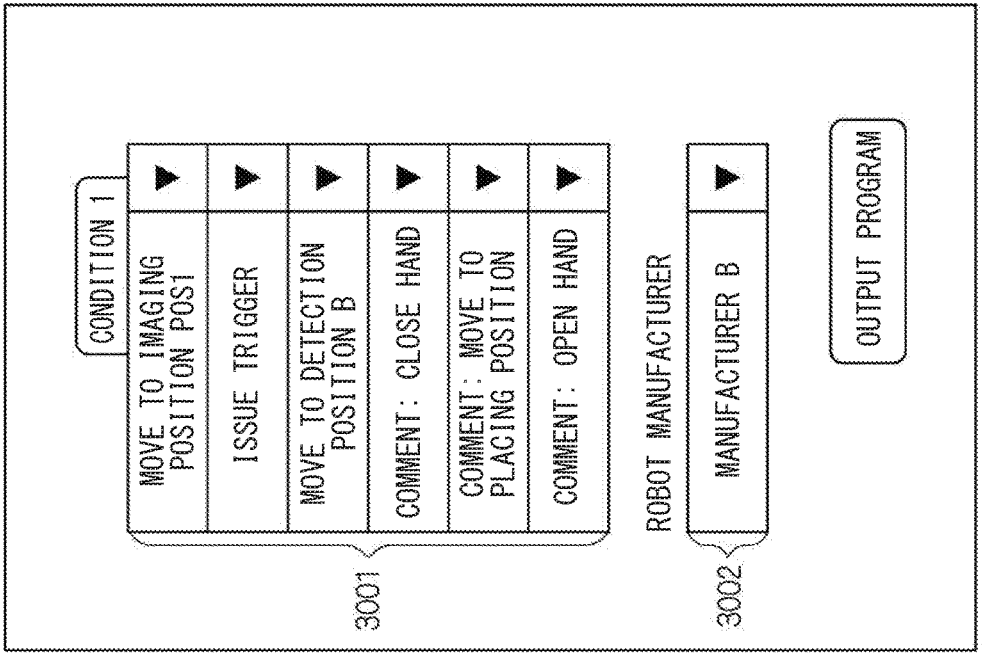
FIGS. 30A and 30B are illustrative views of a condition setting screen showing examples of setting different operation conditions in the image processing system according to the second embodiment of the present invention.
Figure 30B:
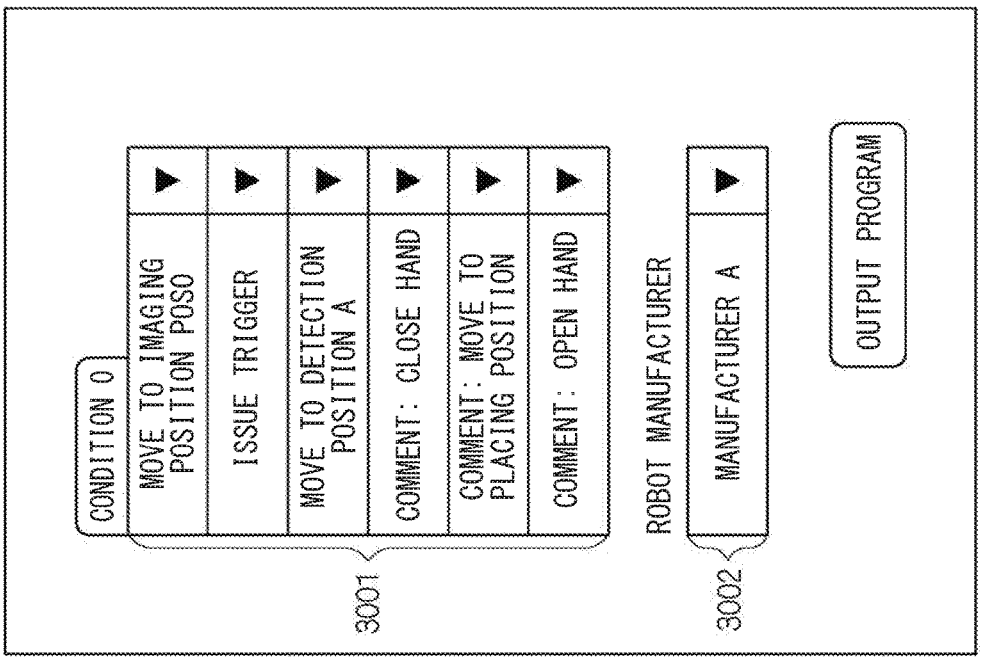

FIGS. 30A and 30B are illustrative views of a condition setting screen showing examples of setting different operation conditions in the image processing system according to the second embodiment of the present invention. First, as shown in FIG. 30A, as a "condition 0", the imaging position is set to "POS0" and the position detected from the image is set to "A" in a condition setting area 3001, and the manufacturer of the manipulator 1 is set to a "manufacturer A" in a manufacturer setting area 3002. Meanwhile, as shown in FIG. 30B, as a "condition 1", the imaging position is set to "POS1" and the position detected from the image is set to "B" in the condition setting area 3001, and the manufacturer of the manipulator 1 is set to the "manufacturer A" in a manufacturer setting area 3002. Herein, the manipulator 1 of the same manufacturer is made to take different motions.

FIG. 31 is an illustrative view of an operation program capable of switching to a different operation condition in the image processing system according to the second embodiment of the present invention. As shown in FIG. 31, a source code 3100 is a command to establish data communication with the image processing apparatus 3. A source code 3101 is a command to execute switching of the operation condition in accordance with a value of Val0.

Specifically, when the value of Val0 is 0, a source code 3102 based on the condition 0 is executed, and when the value of Val0 is 1, a source code 3103 based on the condition 1 is executed. It is to be noted that a source code 3100 may be automatically generated, or additionally written by the user.

Figure 32:
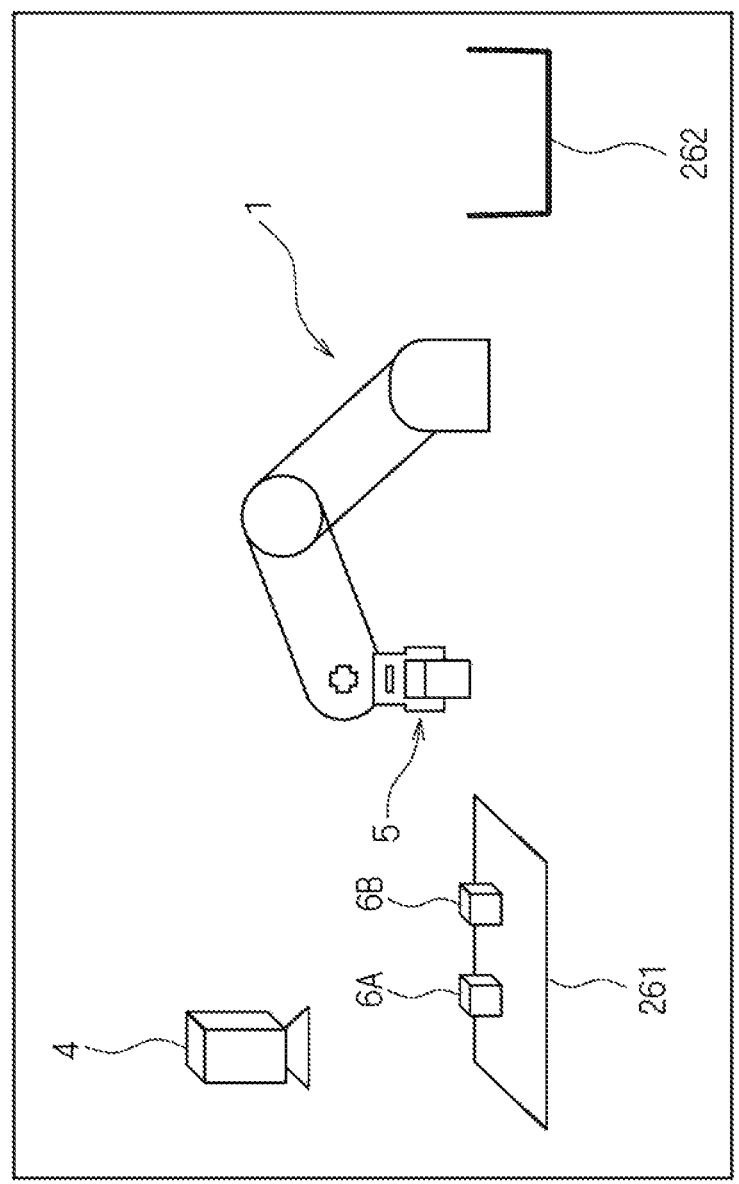
FIG. 32 is a schematic view for explaining execution of picking that requires switching of the operation condition in the image processing system according to the second embodiment of the present invention.

FIG. 32 is a schematic view for explaining execution of picking that requires switching of the operation condition in the image processing system according to the second embodiment of the present invention. As shown in FIG. 32, in the image processing system according to the present second embodiment, the workpiece 6A or 6B is moved from the pickup position 261 to the placing position 262.

Specifically, while the image of the workpiece 6A or workpiece 6B at the pickup position 261 is captured by the imaging device 4, the workpiece 6A or workpiece 6B is grasped by the end effector 5 of the manipulator 1, moved to the placing position 262, and then released. Since two workpieces cannot be held at the same time, first, an operation program for grasping and moving the workpiece 6A is executed, and then an operation program for grasping and moving the workpiece 6B is executed.

Figure 33A:
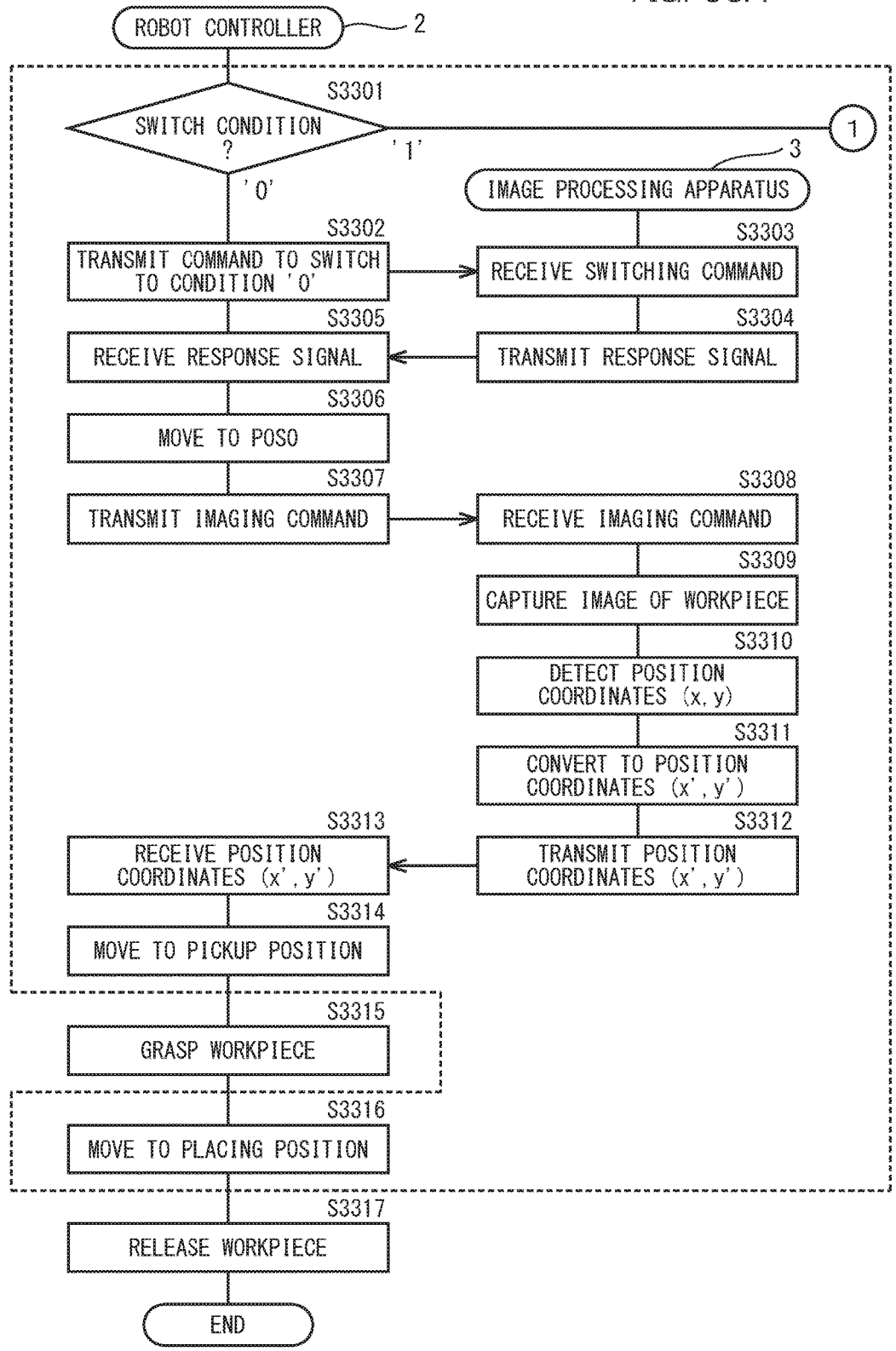
FIG. 33A is a flowchart showing a processing procedure for picking which includes switching of the operation condition in the image processing system according to the second embodiment of the present invention.
Figure 33B:
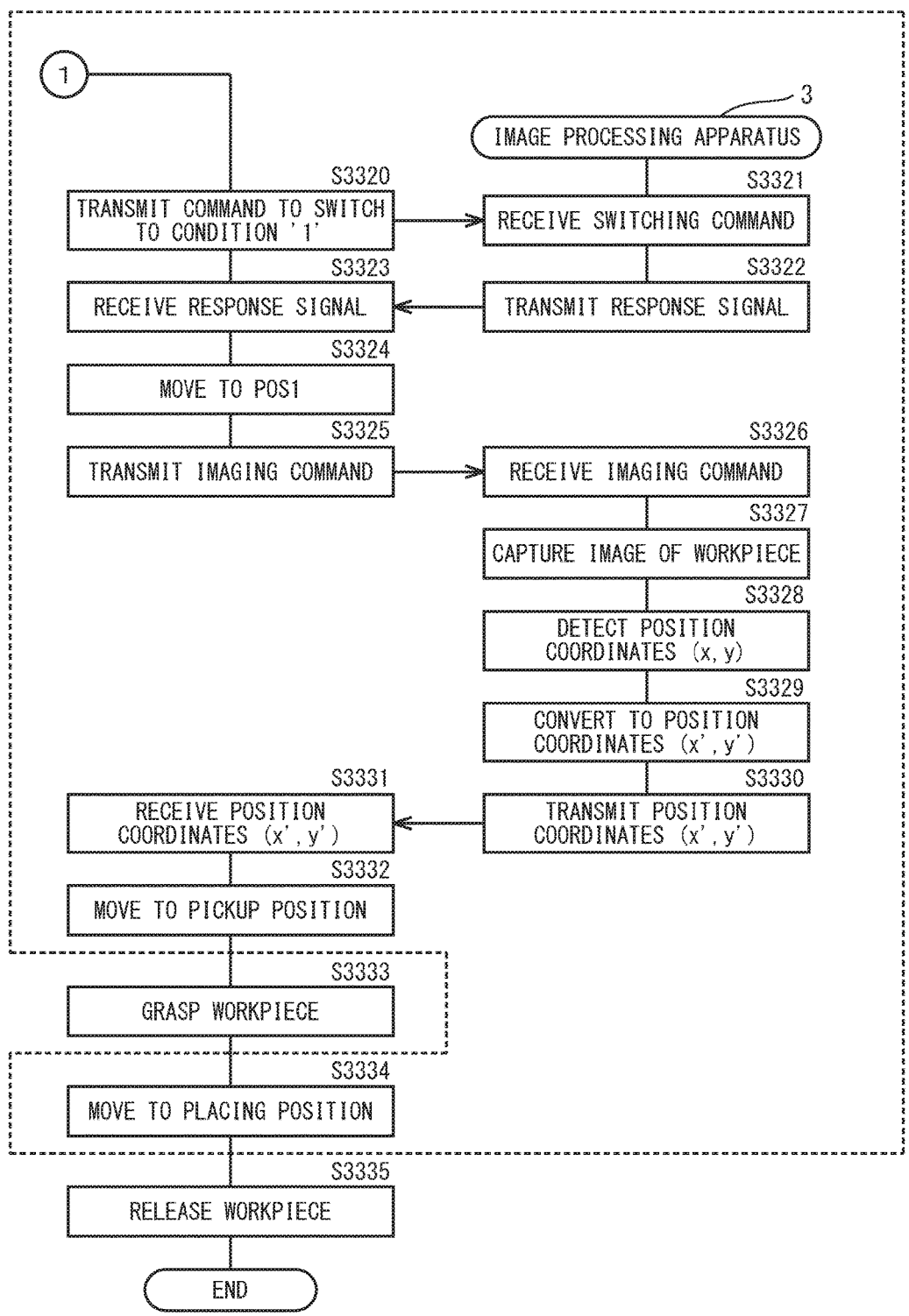
FIG. 33B is a flowchart showing a processing procedure for picking which includes switching of the operation condition in the image processing system according to the second embodiment of the present invention.

FIGS. 33A and 33B are flowcharts showing processing procedures for picking which includes switching of the operation condition in the image processing system according to the second embodiment of the present invention. As illustrated in FIGS. 33A and 33B, in regard to switching of the operation condition, the robot controller 2 determines what condition is the condition the setting of which has been accepted in the image processing apparatus 3 (Step S3301). When determining that the setting of switching to the condition '0' has been accepted (Step S3301: '0'), the robot controller 2 transmits a command to switch to the condition '0' to the image processing apparatus 3 (Step S3302).

As for the switching command, as shown in the present second embodiment, the switching command may be individually transmitted, or may be included in the imaging command (imaging trigger) as described later. That is, the condition may be switched by means of the imaging trigger indicating the timing for starting to capture the image of the target 6 by the imaging device 4. Since the settings of operation conditions including at least a kind of operation and an operation sequence are accepted with respect to each imaging trigger, the operation condition can be switched in accordance with the imaging trigger, and hence it is possible to capture the image of the target 6 at appropriate timing in accordance with the operation, and detect the position coordinates of the target 6 on the displayed image.

The image processing apparatus 3 receives the switching command (Step S3303), and transmits a response signal to the robot controller 2 (Step S3304). The robot controller 2 receives the response signal (Step S3305), and moves the end effector 5 of the manipulator 1 to the position POS0 (Step S3306).

The robot controller 2 transmits an imaging command to the image processing apparatus 3 (Step S3307). The image processing apparatus 3 receives the imaging command (Step S3308), and captures the image of the workpiece 6 (Step S3309). The image processing apparatus 3 displays the image of the workpiece 6, detects position coordinates (x, y) of the workpiece 6 on the displayed image (Step S3310), and converts them to position coordinates (x', y') by use of the conversion formula previously obtained by calibration (Step S3311). The image processing apparatus 3 transmits the converted position coordinates (x', y') to the robot controller 2 (Step S3312).

The robot controller 2 receives the position coordinates (x', y') (Step S3313), and moves the end effector 5 of the manipulator 1 to the pickup position 261 for grasping the workpiece 6, which is indicated by the position coordinates (x', y') (Step S3314). The robot controller 2 makes the end effector 5 grasp the workpiece 6 (Step S3315), move to the placing position 262 while grasping the workpiece 6 (Step S3316), and release the workpiece 6 (Step S3317).

When determining that the setting of switching to the condition '1' has been accepted (Step S3301: '1'), the robot controller 2 transmits a command to switch to the condition '1' to the image processing apparatus 3 (Step S3320).

The image processing apparatus 3 receives the switching command (Step S3321), and transmits a response signal to the robot controller 2 (Step S3322). The robot controller 2 receives the response signal (Step S3323), and moves the end effector 5 of the manipulator 1 to the position POS1 (Step S3324).

The robot controller 2 transmits an imaging command to the image processing apparatus 3 (Step S3325). The image processing apparatus 3 receives the imaging command (Step S3326), and captures the image of the workpiece 6 (Step S3327). The image processing apparatus 3 displays the image of the workpiece 6, detects position coordinates (x, y) of the workpiece 6 on the displayed image (Step S3328), and converts them to position coordinates (x', y') by use of the conversion formula previously obtained by calibration (Step S3329). The image processing apparatus 3 transmits the converted position coordinates (x', y') to the robot controller 2 (Step S3330).

The robot controller 2 receives the position coordinates (x', y') (Step S3331), and moves the end effector 5 of the manipulator 1 to the pickup position 261 for grasping the workpiece 6 indicated by the position coordinates (x', y') (Step S3332). The robot controller 2 makes the end effector 5 grasp the workpiece 6 (Step S3333), move to the placing position 262 while grasping the workpiece 6 (Step S3334), and release the workpiece 6 (Step S3335). In addition, it is possible to automatically generate an operation program for controlling the motion of the manipulator 1 by the processing other than the processing in a range surrounded by a dotted line, namely Step S3315, Step S3317, Step S3333 and Step S3335.

As described above, according to the present second embodiment, a movement command and a motion command to control the motion of the end effector 5 of the manipulator 1 can be transmitted from the image processing apparatus 3 to the robot controller 2, thus eliminating the need for the user to understand machine language which varies by type of the manipulator (robot) 1, and enabling the test operation of the manipulator 1 to be performed so as to check whether or not it takes a correct motion. This eliminates the need for a complex procedure for checking motions every time all operation programs are completed, thus allowing the program to start up as a system in an early stage.

In addition, the present invention is not restricted to the above embodiment, and a variety of changes, modifications and the like can be made so long as being within the scope of the gist of the present invention. For example, using a motion controller in place of the robot controller 2 can expand an application range.

Further, in the conventional technique, in the case of acquiring a movement target position by the robot controller 2, relative position coordinates have been received from the image processing apparatus 3. For example, the image processing apparatus 3 has detected a difference distance X (a difference in an X-direction), a difference distance Y (a difference in a Y-direction) and a difference angle θ (a rotational angle on an X-Y plane) which are differences generated by moving, and the robot controller 2 has added the received difference distance X, difference distance Y and difference angle θ to a reference position, to specify the movement target position.

However, in the present embodiment, it is possible to previously store a coordinate system including a reference position in the image processing apparatus 3. Hence it is possible to transmit, to the robot controller 2, coordinate values of the movement target position themselves calculated in the image processing apparatus 3, instead of relative position coordinates being the difference distance X, the difference distance Y and the difference angle θ.

This eliminates the need to previously store the reference coordinates on the robot controller 2 side in the case of moving the end effector 5 of the manipulator 1. Accordingly, the coordinate values of the movement target position can be outputted only by the image processing apparatus 3, which eliminates the need to newly set reference coordinates for a new workpiece 6 in the case of replacing the workpiece 6, and thus prevents the operation from being complex.

What is claimed is:

1. An image processing apparatus comprising:
a communication device capable of performing data communication with a robot controller that controls a motion of a robot;
an imaging device that captures an image of a target being a target for an operation by the robot;
a movement coordinate acquiring unit for acquiring first coordinate values being each of position coordinates of movement destinations of an end effector of the robot;
an imaging controlling unit for controlling an operation of the imaging device so as to capture an image of a target at each of the movement destinations of the end effector;
an image detecting unit for detecting second coordinate values being position coordinates of the target based on the image of the target captured at each of the movement destinations;
a calibration executing unit for calculating a conversion rule between the first coordinate values acquired by the movement coordinate acquiring unit and the second coordinate values detected by the image detecting unit;
a robot selection accepting unit for accepting a selection of a type of the robot,
a storage unit for storing a position coordinate of the end effector obtained by the movement coordinate acquiring unit;
an operation setting accepting unit for accepting selections of a plurality of operations which the robot controller is made to execute out of a plurality of operations including an operation of transmitting an imaging trigger indicating timing for starting to capture the image of the target to the imaging device, an operation of detecting a position coordinate of the target based on the image captured by the imaging device and moving the end effector to the position coordinate converted by the conversion rule, an operation of moving the end effector to the position coordinate stored in the storage unit, and accepting a setting of an execution sequence of the plurality of operations the selections of which have been accepted; and a program generating unit for generating an operation program corresponding to each of the plurality of operations in accordance with a format specified by type of the robot selected by the robot selection accepting unit, the selections of which have been accepted in the operation setting accepting unit, in accordance with the execution sequence the setting of which has been accepted.

2. The image processing apparatus according to claim 1, wherein the program generating unit generates, as editable text data, each of the operation programs corresponding to the plurality of operations the selections of which have been accepted, in accordance with the execution sequence the setting of which has been accepted.

3. The image processing apparatus according to claim 1, wherein the operation setting accepting unit accepts settings of operation conditions including at least a kind of operation and an operation sequence with respect to each imaging trigger or processing switching command which is received from the robot controller, the imaging trigger indicating timing for starting to capture the image of the target by the imaging device.

4. The image processing apparatus according to claim 3, wherein the program generating unit generates an operation program concerning a series of plurality of operations including at least an operation of moving the end effector to the first coordinate values or the second coordinate values and an operation of transmitting the imaging trigger out of the operations by the robot controller.

5. The image processing apparatus according to claim 1, wherein the operation setting accepting unit accepts a setting of a standby command to the end effector.

6. The image processing apparatus according to claim 1, comprising a robot selection accepting unit for accepting a selection of a type of the robot,
wherein the program generating unit generates the operation program in accordance with a format specified by type of the robot the selection of which has been accepted.

7. The image processing apparatus according to claim 1, wherein the program generating unit generates the operation program to establish data communication with the robot controller.

8. The image processing apparatus according to claim 1, comprising
a movement command transmitting unit for transmitting to the robot controller a movement command to move the end effector to the first coordinate values or the second coordinate values.

9. The image processing apparatus according to claim 1, comprising
a movement command transmitting unit for transmitting to the robot controller a movement command to move the end effector to a position a specification of which has been accepted on the captured image where the target is displayed.

10. The image processing apparatus according to claim 1, comprising
a movement destination selecting unit for acquiring a plurality of sets of first coordinate values of the end effector, and accepting a selection of one set of first coordinate values as a movement destination of the end effector out of the plurality of sets of first coordinate values.

11. An image processing system comprising:
a robot controller that controls a motion of a robot; and
an image processing apparatus including a communication device connected to the robot controller so as to perform data communication with the robot controller, and an imaging device that captures an image of a target being a target for an operation by the robot,
wherein the image processing apparatus includes:
a movement coordinate acquiring unit for acquiring first coordinate values being each of position coordinates of movement destinations of an end effector of the robot;
an imaging controlling unit for controlling an operation of the imaging device so as to capture an image of a target at each of the movement destinations of the end effector;
an image detecting unit for detecting second coordinate values being position coordinates of the target based on the image of the target captured at each of the movement destinations;
a calibration executing unit for calculating a conversion rule between the first coordinate values acquired by the movement coordinate acquiring unit and the second coordinate values detected by the image detecting unit;
a robot selection accepting unit for accepting a selection of a type of the robot;
a storage unit for storing a position coordinate of the end effector obtained by the movement coordinate acquiring unit;
an operation setting accepting unit for accepting selections of a plurality of operations which the robot controller is made to execute out of a plurality of operations including an operation of transmitting an imaging trigger indicating timing for starting to capture the image of the target to the imaging device, an operation of detecting a position coordinate of the target based on the image captured by the imaging device and moving the end effector to the position coordinate converted by the conversion rule, an operation of moving the end effector to the position coordinate stored in the storage unit, and accepting a setting of an execution sequence of the plurality of operations the selections of which have been accepted; and
a program generating unit for generating an operation program corresponding to each of the plurality of operations in accordance with a format specified by type of the robot selected by the robot selection accepting unit, the selections of which have been accepted in the operation setting accepting unit, in accordance with the execution sequence the setting of which has been accepted.

12. The image processing system according to claim 11, wherein the program generating unit generates, as editable text data, each of the operation programs corresponding to the plurality of operations the selections of which have been accepted, in accordance with the execution sequence the setting of which has been accepted.

13. The image processing system according to claim 11, wherein the operation setting accepting unit accepts settings of operation conditions including at least a kind of operation and an operation sequence with respect to each imaging trigger or processing switching command which is received from the robot controller, the imaging trigger indicating timing for starting to capture the image of the target by the imaging device.

14. The image processing system according to claim 13, wherein the program generating unit generates an operation program concerning a series of plurality of operations including at least an operation of moving the end effector to the first coordinate values or the second coordinate values and an operation of transmitting the imaging trigger out of the operations by the robot controller.

15. The image processing system according to claim 11, wherein the operation setting accepting unit accepts a setting of a standby command to the end effector.

16. The image processing system according to claim 11, wherein
the image processing apparatus includes a robot selection accepting unit for accepting a selection of a type of the robot, and
the program generating unit generates the operation program in accordance with a format specified by type of the robot the selection of which has been accepted.

17. The image processing system according to claim 11, wherein the program generating unit generates the operation program to establish data communication with the robot controller.

18. The image processing system according to claim 11, wherein the image processing apparatus includes a movement command transmitting unit for transmitting to the robot controller a movement command to move the end effector to the first coordinate values or the second coordinate values.

19. The image processing system according to claim 11, wherein the image processing apparatus includes a movement command transmitting unit for transmitting to the robot controller a movement command to move the end effector to a position a specification of which has been accepted on the captured image where the target is displayed.

20. An image processing method which can be executed by an image processing system composed of:
a robot controller that controls a motion of a robot; and
an image processing apparatus including a communication device connected to the robot controller so as to perform data communication with the robot controller, and an imaging device that captures an image of a target being a target for an operation by the robot,
the image processing method comprising the steps of:
acquiring first coordinate values being each of position coordinates of movement destinations of an end effector of the robot;
controlling an operation of the imaging device so as to capture an image of a target at each of the movement destinations of the end effector;
detecting second coordinate values being position coordinates of the target based on the image of the target captured at each of the movement destinations;
calculating a conversion rule between the first coordinate values acquired and the second coordinate values detected;
accepting a selection of a type of the robot;
storing a position coordinate of the end effector obtained by the movement coordinate acquiring unit;
accepting selections of a plurality of operations which the robot controller is made to execute out of a plurality of operations including an operation of transmitting an imaging trigger indicating timing for starting to capture the image of the target to the imaging device, an operation of detecting a position coordinate of the target based on the image captured by the imaging device and moving the end effector to the first position coordinate converted by the conversion rule, an operation of moving the end effector to the position coordinate stored in the storage unit, and accepting a setting of an execution sequence of the plurality of operations the selections of which have been accepted; and
generating an operation program corresponding to each of the plurality of operations in accordance with a format specified by type of the robot selected by the robot selection accepting unit, the selections of which have been accepted, in accordance with the execution sequence the setting of which has been accepted.

* * * * *